(12) United States Patent
Tsuji et al.

(10) Patent No.: US 7,399,801 B2
(45) Date of Patent: Jul. 15, 2008

(54) CURABLE COMPOSITION

(75) Inventors: Ryotaro Tsuji, Settsu (JP); Tomoki Hiiro, Settsu (JP)

(73) Assignee: Kaneka Corporation, Osaka (JP)

( * ) Notice: Subject to any disclaimer, the term of this patent is extended or adjusted under 35 U.S.C. 154(b) by 508 days.

(21) Appl. No.: 10/491,828

(22) PCT Filed: Oct. 3, 2002

(86) PCT No.: PCT/JP02/10354

§ 371 (c)(1),
(2), (4) Date: Apr. 6, 2004

(87) PCT Pub. No.: WO03/033569

PCT Pub. Date: Apr. 24, 2003

(65) Prior Publication Data

US 2004/0249026 A1 Dec. 9, 2004

(30) Foreign Application Priority Data

Oct. 10, 2001 (JP) .............................. 2001-313234

(51) Int. Cl.
 *C08K 5/36* (2006.01)
 *C08F 8/00* (2006.01)
 *C08F 4/00* (2006.01)

(52) U.S. Cl. .................. 524/392; 524/556; 525/330.2; 525/330.6; 526/222

(58) Field of Classification Search .................. 524/81, 524/392, 556; 526/222
See application file for complete search history.

(56) References Cited

U.S. PATENT DOCUMENTS

| 3,711,451 A | * | 1/1973 | Csontos | .................. 528/373 |
| 6,737,470 B1 | * | 5/2004 | Yako et al. | .................. 524/588 |

FOREIGN PATENT DOCUMENTS

| GB | 1 462 730 | 1/1977 |
| JP | 2001-106726 | 4/2001 |
| JP | 2002-265508 | 9/2002 |
| WO | WO 98/01478 | 1/1998 |

OTHER PUBLICATIONS

Machine Translation of JP 2002-265508, Sep. 18, 2002.*
Machine Translation of JP 2001-106726, Apr. 17, 2001.*

* cited by examiner

*Primary Examiner*—Vasu Jagannathan
*Assistant Examiner*—Vickey Ronesi
(74) *Attorney, Agent, or Firm*—Kenyon & Kenyon LLP

(57) ABSTRACT

Provided is a curable composition which can easily regulate the properties of a cured object prepared therefrom, which can prepare a cured object that does not substantially discolor or soften a finishing agent or coating material applied to the surface thereof, and which has a high curing rate in the inner regions. The curable composition contains (A) a polymer having at least one mercapto group at the molecular ends, the polymer being derived from a thiocarbonylthio group-containing polymer (a2) prepared by polymerizing a monomer (a1) which contains an acrylic ester as a principal component and which contains 50% by weight or more of the acrylic ester and less than 50% by weight of a monomer copolymerizable with the acrylic ester in the presence of a thiocarbonylthio group-containing compound; (B) a compound having at least two mercapto groups per molecule; and (C) an oxidizing agent.

9 Claims, No Drawings

CURABLE COMPOSITION

This application is a 371 national phase application of PCT/JP02/10354 filed on 3 Oct. 2002, claiming priority to JP 2001-313234, filed on 10 Oct. 2001, the contents of which are incorporated herein by reference in their entirety.

TECHNICAL FIELD

The present invention relates to curable compositions. More particularly, the invention relates to a curable composition which contains a polymer including a mercapto group-containing acrylic ester as a principal component and which can be cured by disulfide bond formation reaction.

BACKGROUND ART

Examples of known curable compositions which contain mercapto group-containing polymers as essential components and which can be cured by disulfide bond formation reaction include compositions containing a polysulfide polymer, such as Thiokol (manufactured by Toray Thiokol Co., Ltd.); a modified polysulfide polymer, such as Permapol (manufactured by Nippon Shokubai Co., Ltd.); a mercapto group-terminated polyisobutylene-based polymer disclosed in Japanese Unexamined Patent Application Publication No. 2001-106726; or the like as an essential component. These compositions are used for sealants, oil-resistant coating materials, lining materials, hose materials, printing rollers, cold casting materials, potting materials, modifiers for paint and adhesives, softeners, etc.

However, in some cases, polysulfide polymers may discolor or soften finishing agents or paint applied to surfaces of cured objects, which gives rise to problems particularly when used as elastic sealants. With respect to the compositions using the polyisobutylene-based polymer disclosed in Japanese Unexamined Patent Application Publication No. 2001-106726, cured objects exhibit poor heat resistance, oil resistance, and weatherability. The modified polysulfide polymer has a long curing time in the inner regions. Furthermore, in polysulfide polymers and modified polysulfide polymers, it is difficult to accurately control the molecular weight or narrow the molecular weight distribution, and hence it is difficult to accurately control the physical properties, such as moduli and elongation, of cured objects, which are affected by the molecular weights and molecular weight distributions.

DISCLOSURE OF INVENTION

The present invention has been achieved to overcome the problems associated with the conventional techniques. It is an object of the present invention to provide a curable composition which contains a polymer component with a controlled molecular weight and molecular weight distribution, which can easily regulate the properties of a cured object prepared therefrom, which can prepare a cured object that does not substantially discolor or soften a finishing agent or coating material applied to the surface thereof, and which has a high curing rate in the inner regions.

The present inventors have conducted intensive research to overcome the problems described above and have invented the following curable composition.

A curable composition of the present invention contains (A) a polymer having at least one mercapto group at the molecular ends, (B) a compound having at least two mercapto groups per molecule, and (C) an oxidizing agent. The component (A), i.e., the polymer having at least one mercapto group at the molecular ends (hereinafter may be referred to as "mercapto group-containing polymer (A)" or simply as "polymer (A)") is derived from a thiocarbonylthio group-containing polymer (a2) prepared by polymerizing a monomer (a1) in the presence of a thiocarbonylthio group-containing compound. The monomer (a1) contains an acrylic ester as a principal component which contains 50% by weight or more of the acrylic ester and less than 50% by weight of a monomer copolymerizable with the acrylic ester. Specifically, the mercapto group-containing polymer (A) is prepared by Step (I) of preparing the thiocarbonylthio group-containing polymer (a2) by polymerizing the monomer (a1) containing the acrylic ester as the principal component in the presence of the thiocarbonylthio group-containing compound, and by Step (II) of converting the thiocarbonylthio group of the thiocarbonylthio group-containing polymer (a2) into a mercapto group.

The composition of the present invention will now be described in sequence. It is to be understood that the present invention is not limited to that which is described below.

[Monomer (a1) Containing Acrylic Ester as Principal Component]

As described above, the monomer (a1) containing the acrylic ester as a principal component contains the acrylic ester and, as necessary, a monomer copolymerizable with the acrylic ester. Among them, examples of acrylic esters include, but are not limited to, methyl acrylate, ethyl acrylate, n-propyl acrylate, isopropyl acrylate, n-butyl acrylate, hexyl acrylate, 2-ethylhexyl acrylate, cyclohexyl acrylate, octyl acrylate, decyl acrylate, dodecyl acrylate, phenyl acrylate, tolyl acrylate, benzyl acrylate, isobornyl acrylate, 2-methoxyethyl acrylate, 3-methoxybutyl acrylate, 2-hydroxyethyl acrylate, 2-hydroxypropyl acrylate, stearyl acrylate, glycidyl acrylate, 2-acryloyloxypropyldimethoxymethylsilane, 2-acryloyloxypropyltrimethoxysilane, trifluoromethyl acrylate, pentafluoroethyl acrylate, 2,2,2-trifluoroethyl acrylate, 3-dimethylaminoethyl acrylate, isobutyl acrylate, 4-hydroxybutyl acrylate, tert-butyl acrylate, acrylate of alkyl-modified dipentaerythritol, ethylene oxide-modified bisphenol A diacrylate, Carbitol acrylate, acrylate of ε-caprolactone-modified dipentaerythritol, caprolactone-modified tetrahydrofurfuryl acrylate, diacrylate of caprolactone-modified neopentyl glycol hydroxypivalate, ditrimethylolpropane tetraacrylate, dipentaerythritol hexaacrylate, dipentaerythritol pentaacrylate, tetraethylene glycol acrylate, tetrahydrofurfuryl acrylate, tripropylene glycol acrylate, trimethylolpropane ethoxy triacrylate, trimethylolpropane triacrylate, neopentyl glycol diacrylate, diacrylate of neopentyl glycol hydroxypivalate, 1,9-nonanediol acrylate, 1,4-butanediol acrylate, 2-propanoic acid [2-[1,1-dimethyl-2-[(1-oxo-2-propenyl)oxy]ethyl]-5-ethyl-1,3-dioxane-5-yl]methyl ester, 1,6-hexanediol acrylate, pentaerythritol triacrylate, 2-acryloyloxypropylhydrogen phthalate, methyl 3-methoxyacrylate, and allyl acrylate. Among the acrylic esters described above, in view of the fact that polymers with narrow molecular weight distributions are obtained, acrylic esters having one unsaturated bond per molecule are preferable; and in view of availability and cost, acrylic esters of alcohols with 1 to 10 carbon atoms are more preferable. For example, n-butyl acrylate, ethyl acrylate, and 2-methoxyethyl acrylate are particularly preferably used. These acrylic esters may be used alone or in combination.

Examples of monomers copolymerizable with the acrylic ester include, but are not limited to, methacrylic esters, aromatic alkenyl compounds, vinyl cyanide compounds, conjugated diene compounds, halogen-containing unsaturated compounds, silicon-containing unsaturated compounds, unsaturated dicarboxylic compounds, vinyl ester compounds, allyl ester compounds, unsaturated group-containing ether compounds, maleimide compounds, acrylic acid, methacrylic acid, acrolein, methacrolein, cyclopolymerizable monomers, and N-vinyl compounds. These monomers copolymerizable with the acrylic ester may be used alone or in combination.

Among the monomers copolymerizable with the acrylic ester described above, examples of methacrylic esters include, but are not limited to, methyl methacrylate, ethyl methacrylate, n-butyl methacrylate, isobutyl methacrylate, tert-butyl methacrylate, 2-ethylhexyl methacrylate, dodecyl methacrylate, tridecyl methacrylate, stearyl methacrylate, cyclohexyl methacrylate, benzyl methacrylate, 2-hydroxyethyl methacrylate, 2-hydroxypropyl methacrylate, dimethylaminoethyl methacrylate, diethylaminoethyl methacrylate, glycidyl methacrylate, tetrahydrofurfuryl methacrylate, ethylene glycol dimethacrylate, triethylene glycol dimethacrylate, tetraethylene glycol dimethacrylate, 1,3-butylene glycol dimethacrylate, trimethylolpropane trimethacrylate, isopropyl methacrylate, pentyl methacrylate, hexyl methacrylate, heptyl methacrylate, octyl methacrylate, nonyl methacrylate, decyl methacrylate, phenyl methacrylate, tolyl methacrylate, isobornyl methacrylate, 2-methoxyethyl methacrylate, 3-methoxybutyl methacrylate, 2-aminoethyl methacrylate, 2-methacryloyloxypropyltrimethoxysilane, 2-methacryloyloxypropyldimethoxymethylsilane, trifluoromethyl methacrylate, pentafluoroethyl methacrylate, and 2,2,2-trifluoroethyl methacrylate.

Among the monomers copolymerizable with the acrylic ester, examples of aromatic alkenyl compounds include, but are not limited to, styrene, α-methylstyrene, p-methylstyrene, p-methoxystyrene, divinylbenzene, and vinylnaphthalene.

Among the monomers copolymerizable with the acrylic ester, examples of vinyl cyanide compounds include, but are not limited to, acrylonitrile and methacrylonitrile.

Among the monomers copolymerizable with the acrylic ester, examples of conjugated diene compounds include, but are not limited to, butadiene, isoprene, and chloroprene.

Among the monomers copolymerizable with the acrylic ester, examples of halogen-containing unsaturated compounds include, but are not limited to, vinyl chloride, vinylidene chloride, tetrafluoroethylene, hexafluoropropylene, vinylidene fluoride, and vinyl bromide.

Among the monomers copolymerizable with the acrylic ester, examples of silicon-containing unsaturated compounds include, but are not limited to, vinyltrimethoxysilane, vinyltriethoxysilane, vinyltrimethylsilane, vinyltriphenylsilane, vinyltriethylsilane, and α,ω-divinylpoly(dimethylsiloxane).

Among the monomers copolymerizable with the acrylic ester, examples of unsaturated dicarboxylic compounds include, but are not limited to, maleic anhydride, maleic acid, maleate monoesters, maleate diesters, fumaric acid, fumarate monoesters, and fumarate diesters.

Among the monomers copolymerizable with the acrylic ester, examples of vinyl ester compounds include, but are not limited to, vinyl acetate, vinyl propionate, vinyl pivalate, vinyl benzoate, vinyl cinnamate, divinyl carbonate, vinylethyl carbonate, and vinylphenyl carbonate.

Among the monomers copolymerizable with the acrylic ester, examples of allyl ester compounds include, but are not limited to, allyl acetate, allyl propionate, allyl pivalate, allyl benzoate, allyl cinnamate, diallyl carbonate, allylmethyl carbonate, and allylphenyl carbonate.

Among the monomers copolymerizable with the acrylic ester, examples of unsaturated group-containing ether compounds include, but are not limited to, vinyl phenyl ether, vinyl ethyl ether, divinyl ether, trimethylolpropane monovinyl ether, trimethylolpropane divinyl ether, trimethylolpropane trivinyl ether, pentaerythritol monovinyl ether, pentaerythritol divinyl ether, pentaerythritol trivinyl ether, pentaerythritol tetravinyl ether, 1,4-butanediol monovinyl ether, 1,4-butanediol divinyl ether, ethylene glycol monovinyl ether, ethylene glycol divinyl ether, propylene glycol monovinyl ether, propylene glycol divinyl ether, polyethylene glycol monovinyl ether, polyethylene glycol divinyl ether, polypropylene glycol monovinyl ether, polypropylene glycol divinyl ether, vinyl glycidyl ether, allyl phenyl ether, allyl ethyl ether, diallyl ether, vinyl allyl ether, trimethylolpropane monoallyl ether, trimethylolpropane diallyl ether, trimethylolpropane triallyl ether, pentaerythritol monoallyl ether, pentaerythritol diallyl ether, pentaerythritol triallyl ether, pentaerythritol tetraallyl ether, 1,4-butanediol monoallyl ether, 1,4-butanediol diallyl ether, ethylene glycol monoallyl ether, ethylene glycol diallyl ether, propylene glycol monoallyl ether, propylene glycol diallyl ether, polyethylene glycol monoallyl ether, polyethylene glycol diallyl ether, polypropylene glycol monoallyl ether, polypropylene glycol diallyl ether, and allyl glycidyl ether.

Among the monomers copolymerizable with the acrylic ester, examples of maleimide compounds include, but are not limited to, maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

Among the monomers copolymerizable with the acrylic ester, examples of cyclopolymerizable compounds include, but are not limited to, 1,6-heptadiene and diallylammonium salts, such as diallyldiethylammonium chloride.

Among the monomers copolymerizable with the acrylic ester, examples of N-vinyl compounds include, but are not limited to, N-vinyl pyrrolidone and N-vinyl carbazole.

Among the monomers copolymerizable with the acrylic ester, in view of availability and cost, preferred is a compound selected from the group consisting of methacrylic esters, styrene, acrylonitrile, methacrylonitrile, vinyl chloride, vinylidene chloride, vinyl acetate, butadiene, isoprene, and chloroprene. In view of ease of copolymerization with the acrylic ester, preferred is a compound selected from the group consisting of methacrylic esters, styrene, and acrylonitrile. More preferred is a compound selected from the group consisting of methyl methacrylate, styrene, and acrylonitrile.

Preferably, the monomer (a1) containing the acrylic ester as the principal component contains 80% by weight or more of the acrylic ester and less than 20% by weight of the monomer copolymerizable with the acrylic ester in view of the fact that the modulus, elongation, and flexibility of the resultant cured object are well balanced. The monomer (a1) containing the acrylic ester as the principal component may be composed of only the acrylic ester.

[Thiocarbonylthio Group-Containing Compound]

By polymerizing the monomer (a1) containing the acrylic ester as the principal component in the presence of a thiocarbonylthio group-containing compound, a thiocarbonylthio group-containing polymer (a2) is prepared. The thiocarbonylthio group-containing compound is selected from the group consisting of a compound represented by general formula (1) (hereinafter may be referred to as "thiocarbonylthio group-containing compound (1)" or simply as "compound (1)"):

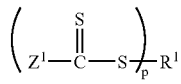 (1)

(wherein $R^1$ is a p-valent organic group of 1 or more carbon atoms which may contain one of nitrogen, oxygen, sulfur, halogen, silicon, phosphorus, and metal atoms; $Z^1$ is a hydrogen atom, halogen atom, or monovalent organic group of 1 or more carbon atoms which may contain one of nitrogen, oxygen, sulfur, halogen, silicon, and phosphorus atoms; when plural $Z^1$s are present, the plural $Z^1$s may be the same or different; and p is an integer of 1 or more), and a compound represented by general formula (2) (hereinafter may be referred to as "thiocarbonylthio group-containing compound (2)" or simply as "compound (2)"):

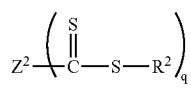 (2)

(wherein $R^2$ is a monovalent organic group of 1 or more carbon atoms which may contain one of nitrogen, oxygen, sulfur, halogen, silicon, phosphorus, and metal atoms; $Z^2$ is a sulfur atom (when q=2), oxygen atom (when q=2), nitrogen atom (when q=3), or q-valent organic group of 1 or more carbon atoms which may contain one of nitrogen, oxygen, sulfur, halogen, silicon, and phosphorus atoms; plural $R^2$s may be the same or different; and q is an integer of 2 or more).

In the thiocarbonylthio group-containing compound (1), as described above, p is an integer of 1 or more, and in view of availability, preferably, p is in the range of 1 to 6. The p-valent organic group $R^1$ of 1 or more carbon atoms is not particularly limited. In view of availability and polymerization activity, more preferably, $R^1$ is an alkyl group of 2 to 20 carbon atoms, a substituted alkyl group of 2 to 20 carbon atoms, an aralkyl group of 7 to 30 carbon atoms, a substituted aralkyl group of 7 to 30 carbon group, or a polyvalent organic substituent of any one of these monovalent substituents in which at least one hydrogen atom is replaced by a dangling bond.

Specific examples of the organic group $R^1$ include, but are not limited to, groups represented by formulae below.

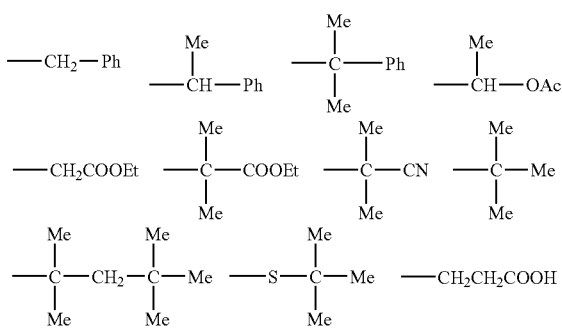

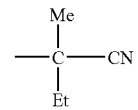

(In the formulae, Me, Et, Ph, and Ac represent methyl, ethyl, phenyl, and acetyl, respectively.)

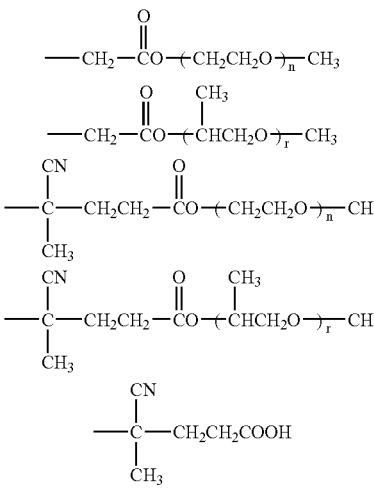

(In the formulae, n is an integer of 1 or more, and r is an integer of 0 or more.)

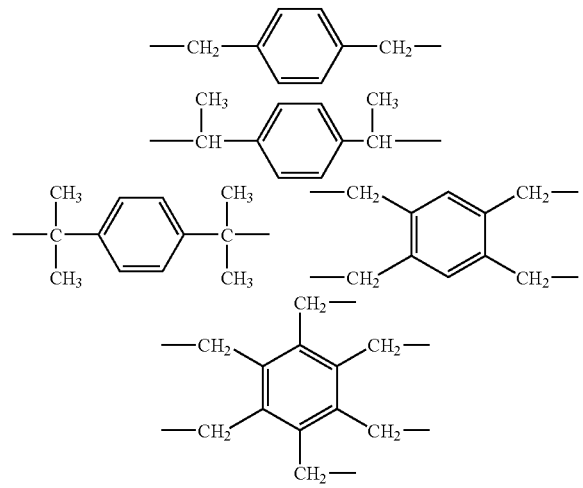

In the above formulae, each of n and r is preferably 500 or less, and more preferably 200 or less, in view of availability.

In the thiocarbonylthio group-containing compound (1), $Z^1$ as the monovalent organic group is not particularly limited. In view of availability and polymerization activity, $Z^1$ is preferably an alkyl group of 1 to 20 carbon atoms, a substituted alkyl group of 1 to 20 carbon atoms, an aryl group of 6 to 20 carbon atoms, a substituted aryl group of 6 to 30 carbon atoms, an aralkyl of 7 to 30 carbon atoms, a substituted aralkyl group of 7 to 30 carbon atoms, an N-alkyl-N-arylamino group of 7 to 30 carbon atoms, an N,N-diarylamino group of 12 to 30 carbon atoms, a thioaryl group of 6 to 30 carbon atoms, or an alkoxy group of 1 to 20 carbon atoms. Specific examples of the organic group $Z^1$ include, but are not limited to, groups represented by formulae below.

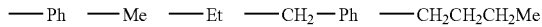
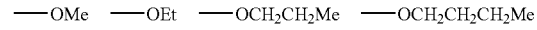
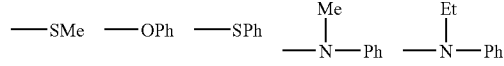
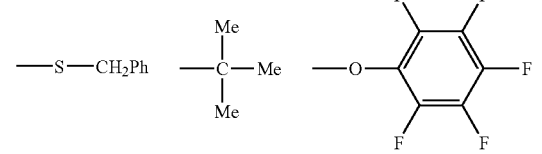

(In the formulae, Me, Et, and Ph represent methyl, ethyl, and phenyl, respectively.)

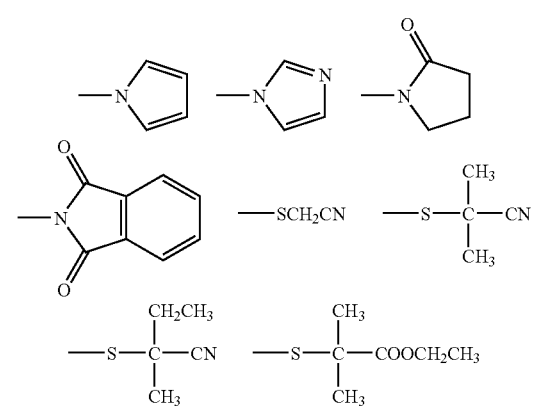

In the thiocarbonylthio group-containing compound (2), as described above, $R^2$ is a monovalent organic group of 1 or more carbon atoms and is not particularly limited. In view of availability and polymerization activity, preferably, $R^2$ is an alkyl group of 2 to 20 carbon atoms, a substituted alkyl group of 2 to 20 carbon atoms, an aralkyl group of 7 to 30 carbon atoms, or a substituted aralkyl group of 7 to 30 carbon group. Specific examples of the organic group $R^2$ include, but are not limited to, groups represented by formulae below.

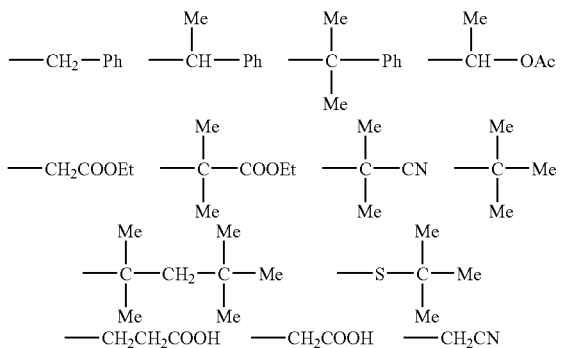

-continued

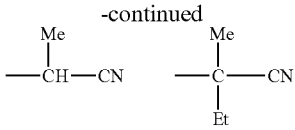

(In the formulae, Me, Et, Ph, and Ac represent methyl, ethyl, phenyl, and acetyl, respectively.)

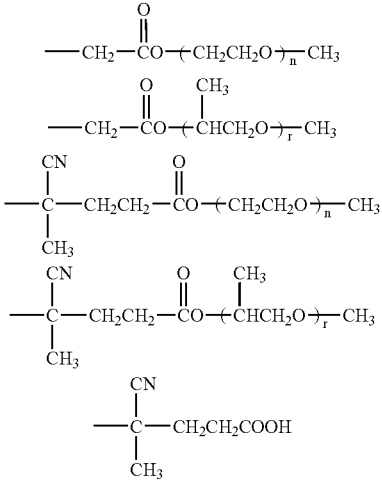

(In the formulae, n is an integer of 1 or more, and r is an integer of 0 or more.) In the above formulae, each of n and r is preferably 500 or less, and more preferably 200 or less, in view of availability.

In the thiocarbonylthio group-containing compound, as described above, q is an integer of 2 or more, and preferably in the range of 2 to 6. The q-valent organic group $Z^2$ is not particularly limited. In view of availability and polymerization activity, preferably, $Z^2$ has any one of structures represented by formulae below.

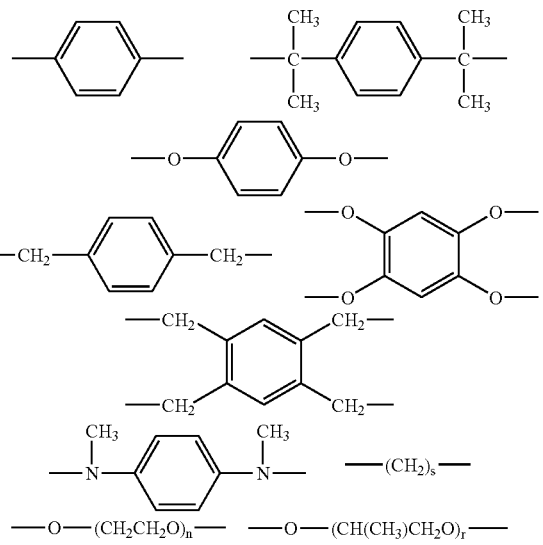

(In the formulae, n is an integer of 1 or more; r is an integer of 0 or more; and s is an integer of 1 or more.) More preferably, $Z^2$ has a divalent aromatic ring structure with 6 to 20 carbon atoms. In the above formulae, in view of availability, each of n and r is preferably 500 or less, and more preferably 200 or less. In view of availability, s is in the range of 1 to 30, and more preferably in the range of 1 to 10.

Specific examples of the thiocarbonylthio group-containing compound include, but are not limited to, compounds represented by formulae below.

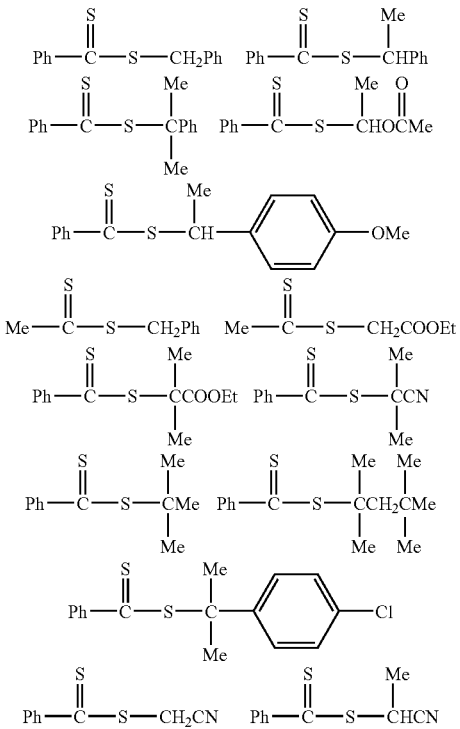

(In the formulae, Me, Et, and Ph represent methyl, ethyl, and phenyl, respectively.)

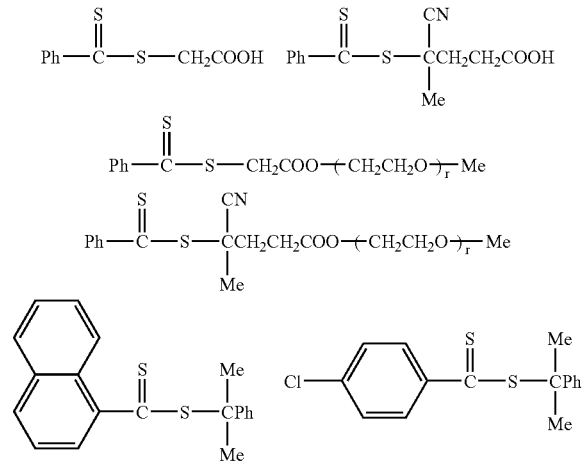

(In the formulae, Me and Ph represent methyl and phenyl, respectively; and r is an integer of 0 or more.)

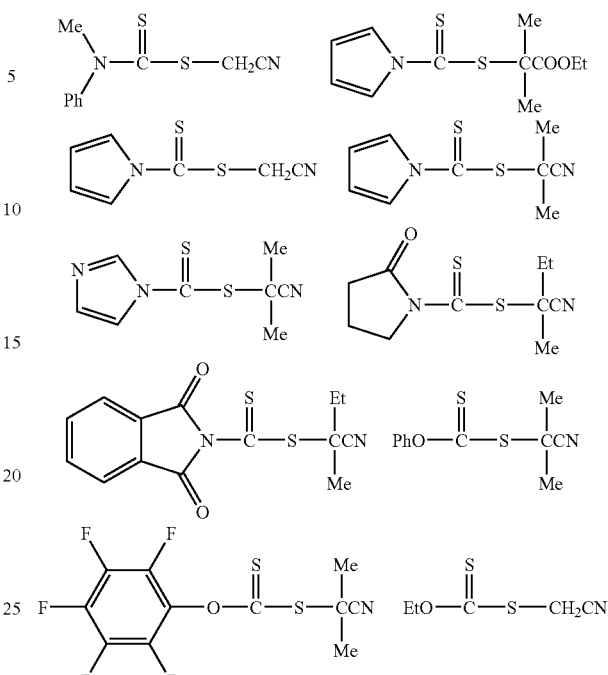

(In the formulae, Me, Et, and Ph represent methyl, ethyl, and phenyl, respectively.)

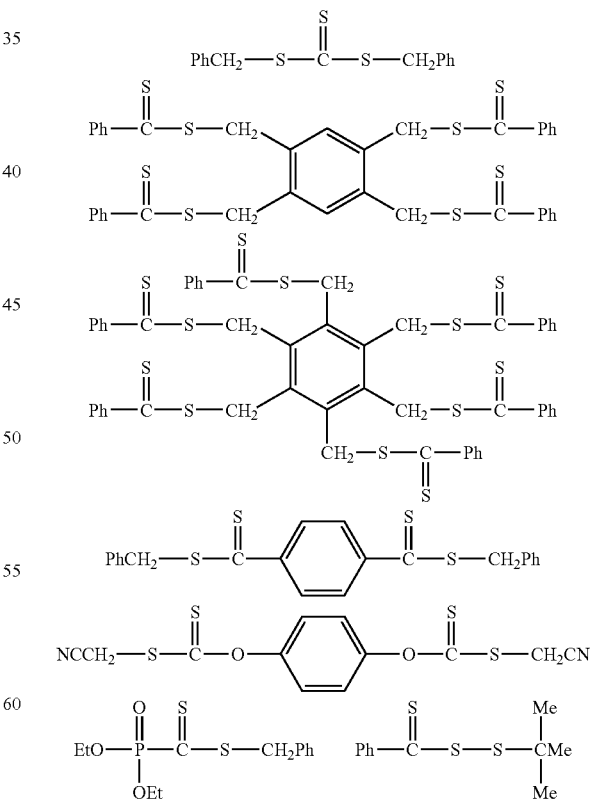

(In the formulae, Me, Et, and Ph represent methyl, ethyl, and phenyl, respectively.)

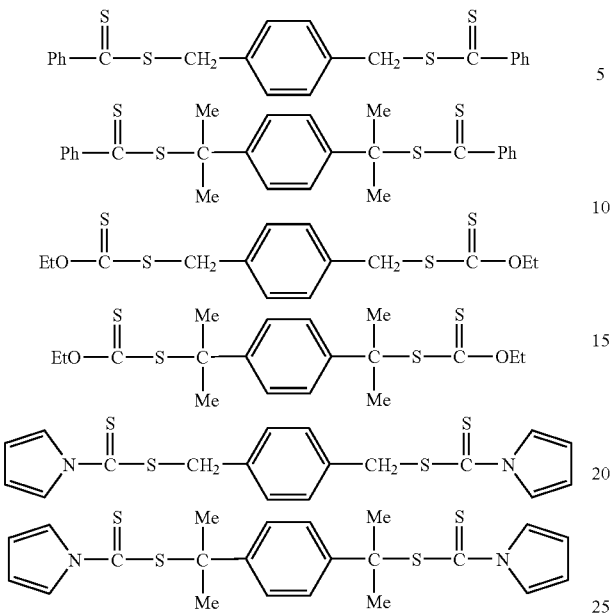
(In the formulae, Me, Et, and Ph represent methyl, ethyl, and phenyl, respectively.)
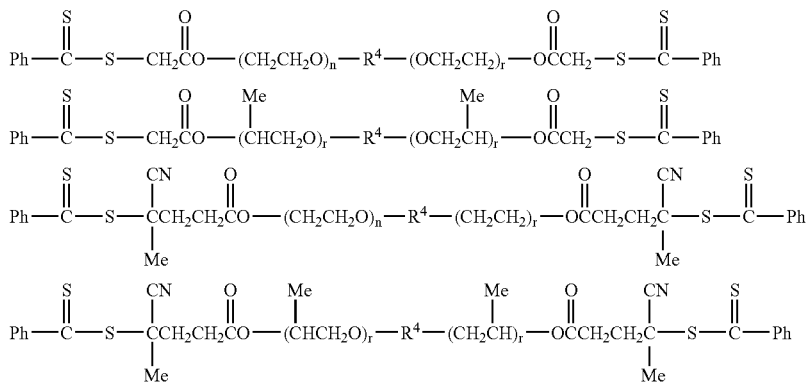
(In the formulae, $R^4$ is a divalent organic group; Me and Ph represent methyl and ethyl, respectively; n is an integer of 1 or more; and r is an integer of 0 or more.)
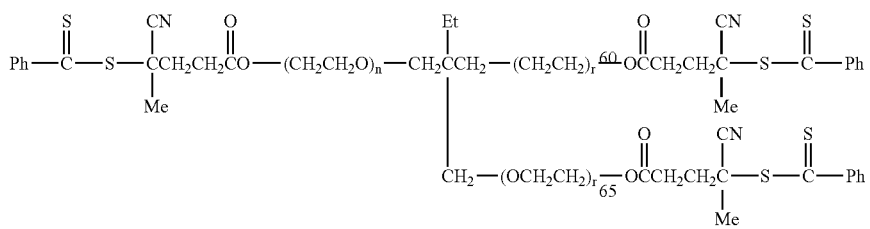

-continued

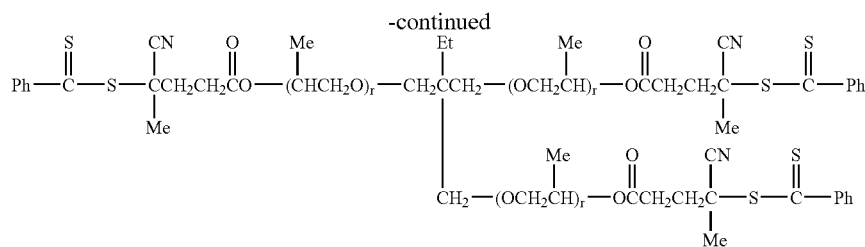

(In the formulae, Me, Et, and Ph represent methyl, ethyl, and phenyl, respectively; n is an integer of 1 or more; and r is an integer of 0 or more.)

In the structure of the thiocarbonylthio group-containing compound, in view of availability, each of n and r is preferably 500 or less, and more preferably 200 or less. Furthermore, in the structure of the thiocarbonylthio group-containing compound, the divalent organic group $R^4$ is not particularly limited. Examples thereof include structures represented by formulae below, (wherein s is an integer of 1 or more).

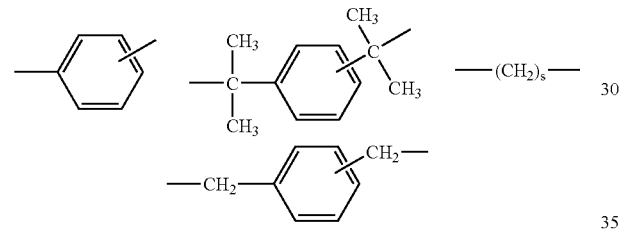

In the formulae, s is preferably in the range of 1 to 30 and more preferably in the range of 1 to 10.

Among the thiocarbonylthio group-containing compounds described above, in view of the fact that it is possible to easily synthesize a telechelic polymer having mercapto groups at both ends, preferred is a compound represented by general formula (3):

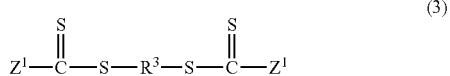

(3)

(wherein $R^3$ is a divalent organic group of 1 or more carbon atoms which may contain one of nitrogen, oxygen, sulfur, halogen, silicon, phosphorus, and metal atoms; each $Z^1$ is a hydrogen atom, halogen atom, or monovalent organic group of 1 or more carbon atoms which may contain one of nitrogen, oxygen, sulfur, halogen, silicon, and phosphorus atoms; and two $Z^1$s may be the same or different).

In the thiocarbonylthio group-containing compound, the divalent organic group $R^3$ is not particularly limited. In view of availability and polymerization activity, preferably, $R^3$ is a divalent aliphatic group of 1 to 20 carbon atoms, a divalent substituted aliphatic group of 2 to 20 carbon atoms, or a divalent aromatic ring-containing aliphatic group of 6 to 20 carbon atoms. Specific examples of the divalent organic group $R^3$ include, but are not limited to, groups represented by formulae below.

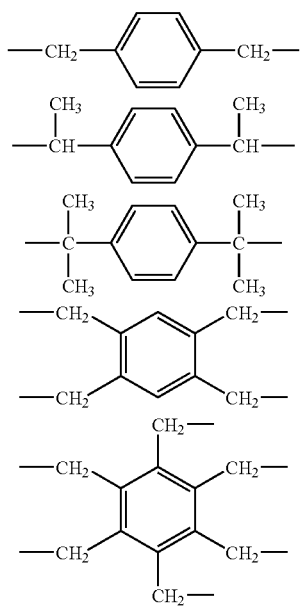

In the thiocarbonylthio group-containing compound (3), examples of the monovalent organic group $Z^1$ are the same as those of $Z^1$ in the thiocarbonylthio group-containing compound (1).

[Preparation of Thiocarbonylthio Group-Containing Polymer (a2)]

The thiocarbonylthio group-containing polymer (a2) is produced by Step (I), i.e., by radically polymerizing the monomer (a1) containing the acrylic ester as the principal component in the presence of the thiocarbonylthio group-containing compound.

The method for radical polymerization in Step (I) is not particularly limited, and any known method may be employed. Examples thereof include, but are not limited to, bulk polymerization, solution polymerization, emulsion polymerization, suspension polymerization, and microsuspension polymerization. Among them, in view of cost and safety, water-based polymerization, such as emulsion polymerization, suspension polymerization, or microsuspension polymerization, is preferred. However, when the polymer obtained in Step (I) is subjected to the reaction in subsequent Step (II) without being isolated, in view of productivity and reactivity, Step (I) is preferably carried out by solution polymerization. In the polymerization reaction, the monomer used for the polymerization may be added into a reactor at one time in the initial stage of the reaction or may be added in portions as the reaction proceeds.

In the present invention, when Step (I) is carried out by solution polymerization, examples of solvents which may be used include, but are not limited to, hydrocarbon solvents, such as heptane, hexane, octane, and mineral spirit; ester solvents, such as ethyl acetate, n-butyl acetate, isobutyl acetate, ethylene glycol monomethyl ether acetate, and diethylene glycol monobutyl ether acetate; ketone solvents, such as acetone, methyl ethyl ketone, methyl isobutyl ketone, diisobutyl ketone, and cyclohexanone; alcohol solvents, such as methanol, ethanol, isopropanol, n-butanol, sec-butanol, and isobutanol; ether solvents, such as tetrahydrofuran, diethyl ether, dibutyl ether, dioxane, ethylene glycol dimethyl ether, and ethylene glycol diethyl ether; amide solvents, such as dimethylformamide, diethylformamide, dimethylacetamide, and diethylacetamide; and aromatic petroleum solvents, such as toluene, xylene, benzene, Swasol 310 (manufactured by Cosmo Oil Co., Ltd.), Swasol 1000 (manufactured by Cosmo Oil Co., Ltd.), and Swasol 1500 (manufactured by Cosmo Oil Co., Ltd.). These solvents may be used alone or in combination. The types and amounts of solvent used may be determined in consideration of the solubility of the monomer, the solubility of the resultant polymer, the polymerization initiator concentration and the monomer concentration suitable for achieving a satisfactory reaction rate, the solubility of the thiocarbonylthio group-containing compound, effects on human body and environment, availability, cost, etc., and are not particularly limited. In view of solubility, availability, and cost, industrially, toluene, dimethylformamide, tetrahydrofuran, ethyl acetate, and acetone are preferable, and toluene is more preferable.

In the present invention, when Step (I) is carried out by emulsion polymerization or microsuspension polymerization, examples of emulsifiers which may be used include, but are not limited to, anionic surfactants, nonionic surfactants, cationic surfactants, and amphoteric surfactants.

Among the emulsifiers described above, examples of anionic surfactants include, but are not limited to, fatty acid soaps, such as potassium laurate, coconut fatty acid potassium, potassium myristate, potassium oleate, diethanolamine salts, sodium oleate, potassium palmitate, potassium stearate, sodium stearate, soap consisting of the mixture of fatty acid sodium salts, semi-hardening beef tallow fatty acid sodium soap, and castor oil potassium soap; alkylsulfuric ester salts, such as sodium dodecyl sulfate, higher alcohol sodium sulfate, triethanolamine dodecyl sulfate, ammonium dodecyl sulfate, sodium polyoxyethylene alkyl ether sulfate, triethanolamine polyoxyethylene alkyl ether sulfate, sodium polyoxyethylene alkylphenyl ether sulfate, sodium 2-ethylhexyl sulfate; sodium alkylsulfonates, such as sodium dodecyl sulfonate; sodium alkylbenzene sulfonates, such as sodium dodecylbenzene sulfonate; sodium dialkylsulfosuccinates, such as sodium di-2-ethylhexyl sulfosuccinate; sodium alkylnaphthalene sulfonates; sodium alkyldiphenyl ether disulfonates; potassium salts of alkylphosphoric acids; sodium salts of a naphthalenesulfonic acid-formalin condensate; polycarboxylate-type polymer anions; methyltaurine acyl (beef tallow) sodium salt; methyltaurine acyl (coconut) sodium salt; sodium cocoyl isethionate; α-sulfofatty acid ester sodium salt; sodium amide ether sulfonate; oleyl sarcosine; sodium lauroyl sarcosine; and rosin acid soap.

Among the emulsifiers described above, examples of nonionic surfactants include, but are not limited to, polyoxyethylene alkyl ethers, such as polyoxyethylene lauryl ether, polyoxyethylene cetyl ether, polyoxyethylene stearyl ether, polyoxyethylene oleyl ether, polyoxyethylene higher alcohol ether, and polyoxyethylene tridecyl ether; polyoxyethylene alkyl aryl ethers, such as polyoxyethylene octyl phenyl ether and polyoxyethylene nonyl phenyl ether (e.g., NONION NS-270); polyoxyethylene esters, such as polyoxyethylene monolaurate, polyoxyethylene monostearate, and polyoxyethylene monooleate; sorbitan fatty acid esters, such as sorbitan monolaurate, sorbitan monopalmitate, sorbitan monostearate, sorbitan tristearate, sorbitan monooleate, sorbitan trioleate, sorbitan sesquioleate, and sorbitan distearate; polyoxyethylene sorbitan fatty acid esters, such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters, such as polyoxyethylene sorbitol tetraoleate; glycerin fatty acid esters, such as glycerol monostearate, and glycerol monooleate; polyglycerin alkyl esters, such as polyglycerin oleate ester, polyglycerin laurate ester, and polyglycerin stearate ester; alkanolamides, such as coconut fatty acid diethanolamide, beef tallow fatty acid diethanolamide, lauric acid diethanolamide, and oleic acid diethanolamide; alkyl polyether amines, such as hydroxyethyllaurylamine, polyoxyethylene laurylamine, polyoxyethylene alkyl(coconut) amine, polyoxyethylene stearylamine, polyoxyethylene alkyl(beef tallow) amine, polyoxyethylene alkyl(beef tallow) propylenediamine, and polyoxyethylene dioleylamine; amine oxides, such as dimethyllaurylamine oxide, dimethylstearylamine oxide, and dihydroxyethyllaurylamine oxide; distearates, such as ethylene glycol distearate, polyoxyethylene distearate, and polyoxypropylene distearate; 1,2-hydroxyphenylstearic acid; and polyoxyethylene-polyoxypropylene-polyoxyethylene block copolymers.

Among the emulsifiers described above, examples of cationic surfactants include, but are not limited to, alkylamine salts, such as coconut amine acetate, stearylamine acetate, octadecylamine acetate, and tetradecylamine acetate; and quaternary ammonium salts, such as lauryltrimethyl ammonium chloride, stearyltrimethyl ammonium chloride, cetyltrimethyl ammonium chloride, distearyldimethyl ammonium chloride, alkylbenzyldimethyl ammonium chloride, hexadecyltrimethyl ammonium chloride, and behenyltrimethyl ammonium chloride.

Among the emulsifiers described above, examples of amphoteric surfactants include, but are not limited to, alkyl betaines, such as lauryl betaine, stearyl betaine, and dimethyllauryl betaine; lauryl diaminoethylglycine sodium salt; amidobetaine; imidazoline; and lauryl carboxy methyl hydroxy ethyl imidazolinium betaine.

These emulsifiers may be used alone or in combination. As necessary, a dispersant for suspension polymerization which will be described below may also be used. In view of satisfactory emulsion and smooth polymerization reaction, the amount of the emulsifier used is preferably 0.1 to 30 parts by weight based on 100 parts by weight of the monomer, but is not limited thereto. Among the emulsifiers described above, in view of stability of emulsion, an anionic surfactant or nonionic surfactant is preferably used. When a nonionic surfactant is used, the HLB of the nonionic surfactant is preferably 10 or more, and more preferably 15 or more. Herein, the HLB is an index showing a hydrophilic-lipophilic balance.

In the present invention, when Step (I) is carried out by suspension polymerization, examples of dispersants which may be used include, but are not limited to, partially saponified poly(vinyl acetate), poly(vinyl alcohol), methyl cellulose, carboxymethyl cellulose, gelatin, poly(alkylene oxide), and combinations of anionic surfactants and dispersing agents, which are commonly used in the art. These may be used alone or in combination. The emulsifier used for emulsion polymerization described above may also be used as necessary. In view of smooth polymerization reaction, the amount of the dispersant used is preferably 0.1 to 30 parts by weight based on 100 parts by weight of the monomer, but is not limited thereto.

In the present invention, when radical polymerization is performed in Step (I), the polymerization initiator or polymerization initiation method used is not particularly limited, and any polymerization initiator or polymerization initiation method commonly used in the art may be employed. Examples of polymerization initiators include, but are not limited to, peroxide polymerization initiators, such as methyl ethyl ketone peroxide, methyl isobutyl ketone peroxide, cyclohexanone peroxide, methyl cyclohexanone peroxide, isobutyryl peroxide, 3,5,5-trimethylhexanoyl peroxide, lauroyl peroxide, benzoyl peroxide, tert-butyl hydroperoxide, cumene hydroperoxide, diisopropylbenzene hydroperoxide, p-menthane hydroperoxide, 1,1,3,3-tetramethylbutyl hydroperoxide, di-tert-butyl peroxide, tert-butyl-α-cumyl peroxide, di-α-cumyl peroxide, 1,4-bis[(tert-butylperoxy)isopropyl]benzene, 1,3-bis[(tert-butylperoxy)isopropyl]benzene, 2,5-dimethyl-2,5-bis(tert-butylperoxy)hexane, 2,5-dimethyl-2,5-bis(tert-butylperoxy)-3-hexyne, 1,1-bis(tert-butylperoxy)-3,3,5-trimethylcyclohexane, n-butyl-4,4-bis(tert-butylperoxy)valerate, 2,2-bis(tert-butylperoxy)butane, tert-butylperoxy acetate, tert-butylperoxy isobutylate, tert-butylperoxy octoate, tert-butylperoxy pivalate, tert-butylperoxy neodecanoate, tert-butylperoxy-3,5,5-trimethyl hexanoate, tert-butylperoxy benzoate, tert-butylperoxy laurate, 2,5-dimethyl-2,5-bis(benzolyperoxy)hexane, bis(2-ethylhexyl)peroxy dicarbonate, diisopropylperoxy dicarbonate, di-sec-butylperoxy dicarbonate, di-n-propylperoxy dicarbonate, bis(3-methoxybutyl)peroxy dicarbonate, bis(2-ethoxyethyl)peroxy dicarbonate, bis(4-tert-butylcyclohexyl) peroxy dicarbonate, O-tert-butyl-O-isopropylperoxy carbonate, and succinic acid peroxide; azo polymerization initiators, such as 2,2'-azobis-(2-amidinopropane)dihydrochloride, dimethyl 2,2'-azobis(isobutyrate), 2,2'-azobis-(4-methoxy-2,4-dimethylvaleronitrile), 2,2'-azobis(isobutyronitrile), 1,1'-azobis(cyclohexane-1-carbonitrile), azocumene, 2,2'-azobis(2-methylbutyronitrile), 2,2'-azobis-(2,4-dimethylvaleronitrile), 4,4'-azobis(4-cyanovaleric acid), 2-(tert-butylazo)-2-cyanopropane, 2,2'-azobis(2,4,4-trimethylpentane), 2,2'-azobis(2-methylpropane), and poly(dimethyl siloxane)-based macromolecular azo polymerization initiators, (for example, VPS-1001 (manufactured by Wako Pure Chemical Industries, Ltd.) and VPS-0501 (manufactured by Wako Pure Chemical Industries, Ltd.)); inorganic peroxides, such as potassium persulfate and sodium persulfate; vinyl monomers which thermally generate radical species, such as styrene; compounds which generate radical species by light, such as benzoin derivatives, benzophenone, acylphosphine oxide, and photo-redox systems; and redox polymerization initiators including sodium sulfite, sodium thiosulfate, sodium formaldehyde sulfoxylate, ascorbic acid, ferrous sulfate, or the like, as a reducing agent, and potassium peroxydisulfate, hydrogen peroxide, tert-butyl hydroperoxide, or the like, as an oxidizing agent. These polymerization initiators may be used alone or in combination. It may also be possible to use a polymerization initiation system by electron irradiation, X-ray irradiation, radiation irradiation, or the like. With respect to polymerization initiation methods, the methods described in Moad and Solomon "The Chemistry of Free Radical Polymerization", Pergamon, London, 1995, pp. 53-95 may be employed.

The amount of polymerization initiator used is not particularly limited. In order to produce a polymer with a narrow molecular weight distribution, the amount of radical species generated during polymerization is preferably 1 mole or less, and more preferably 0.5 moles or less, relative to 1 mole of thiocarbonylthio group. In order to control the amount of radical species generated during polymerization, in addition to the control of the amount of the polymerization initiator, preferably, temperature is controlled in the case of the polymerization initiator which causes thermal dissociation, or the amount of energy is controlled in the case of the polymerization initiation system which generates radicals by light or electron beams. Because of ease of control of polymerization, using a polymerization initiator which causes thermal dissociation, the polymerization reaction is carried out preferably at temperatures which allow the polymerization initiator to have a half-life of 0.5 to 50 hours, more preferably at temperatures which allow the polymerization initiator to have a half-life of 1 to 20 hours, and most preferably at temperatures which allow the polymerization initiator to have a half-life of 5 to 15 hours.

In the radical polymerization in Step (I), by adjusting the ratio of the amount of the thiocarbonylthio group-containing compound to the amount of the monomer to be polymerized, it is possible to control the degree of polymerization and molecular weight of the resultant polymer (A). The degree of polymerization (DP) of the resultant polymer (A) is represented by the equation below in the case when the conversion rate of the monomer is 100%.

$$DP = \text{(Number of moles of monomer)}/\text{(Number of moles of thiocarbonylthio group-containing compound)}$$

The number-average molecular weight (Mn) is calculated by multiplying the DP value by the molecular weight of the monomer. When the conversion rate of the monomer is less than 100%, the number-average molecular weight (Mn) is calculated by multiplying the value obtained assuming that the conversion rate is 100% by the actual conversion rate of the monomer.

In Step (I), the thiocarbonylthio group-containing compound acts as a reversible addition-fragmentation chain transfer agent when the radically polymerizable monomer is radically polymerized. In view of the fact that polymerization proceeds smoothly and that a polymer with a controlled molecular weight and molecular weight distribution can be produced, under the conditions used to carry out the radical polymerization, the chain transfer constant of the thiocarbonylthio group-containing compound is preferably 1 or more, and more preferably 10 or more. The mechanism of action of the thiocarbonylthio group-containing compound as the chain transfer agent and the determination of the chain transfer constant are described, for example, in the following documents or the documents cited therein: PCT Publication No. WO98/01478; PCT Publication No. WO99/05099; PCT Publication No. WO99/31144; Macromolecules 1998, 31(16), 5559-5562; Macromolecules 1999, 32(6), 2071-2074; Polym. Prepr. 1999, 40(2), 342-343; Polym. Prepr. 1999, 40(2), 397-398; Polym. Prepr. 1999, 40(2), 899-900; Polym. Prepr. 1999, 40(2), 1080-1081; Macromolecules 1999, 32(21), 6977-6980; Macromolecules 2000, 33(2), 243-245; and Macromol. Symp. 2000, 150, 33-38.

The production of the thiocarbonylthio group-containing polymer (a2) in Step (I) is illustrated below. When the thiocarbonylthio group-containing compound (1) is used, as illustrated in Scheme 1, by radically polymerizing the monomer (a1) containing acrylic ester as the principal component, a thiocarbonylthio group-containing polymer (a2-1) is produced, (wherein n is the number of repeats of the monomer (a1)).

Scheme 1

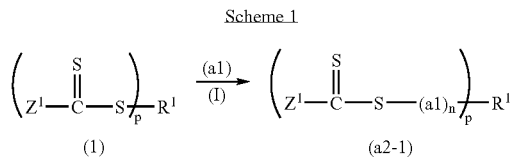

When the thiocarbonylthio group-containing compound (2) is used, as illustrated in Scheme 2, a thiocarbonylthio group-containing polymer (a2-2) is produced, (wherein n is the number of repeats of the monomer (a1)).

Scheme 2

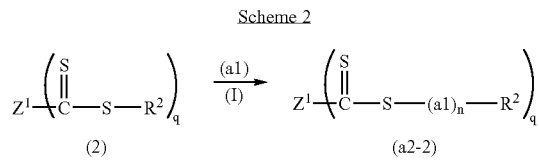

As shown above, a thiocarbonylthio group-containing polymer (a2) having at least one thiocarbonylthio group at the ends of the molecular main chain is prepared by Step (I).

[Mercapto Group-Containing Polymer (A)]

In Step (II), by converting the thiocarbonylthio group of the thiocarbonylthio group-containing polymer (a2) into a mercapto group, a mercapto group-containing polymer (A) is produced. Various processing agents are used in the conversion. Examples of processing agents include, but are not limited to, (i) acidic compounds, (ii) basic compounds, and (iii) hydrogen-nitrogen bond-containing compounds.

Among these processing agents, examples of (i) acidic compounds include, but are not limited to, inorganic acids, such as hydrochloric acid, nitric acid, sulfuric acid, phosphoric acid, hydrofluoric acid, hydrobromic acid, fluoroboric acid, chlorosulfonic acid, hydriodic acid, arsenic acid, and silicofluoric acid; organic acids, such as p-toluenesulfonic acid, trifluoromethyl sulfonic acid, acetic acid, trifluoroacetic acid, methylphosphoric acid, ethylphosphoric acid, n-propylphosphoric acid, isopropylphosphoric acid, n-butylphosphoric acid, laurylphosphoric acid, stearylphosphoric acid, 2-ethylhexylphosphoric acid, isodecylphosphoric acid, dimethyldithiophosphoric acid, diethyldithiophosphoric acid, diisopropyldithiophosphoric acid, and phenylphosphonic acid; and strong acidic ion exchange resins and weak acidic ion exchange resins. Furthermore, compounds which show acidity in reaction with a small amount of water may also be used. Examples of such compounds include acid anhydrides, such as acetic anhydride, propionic anhydride, trifluoroacetic anhydride, phthalic anhydride, and succinic anhydride; acyl halides, such as acetyl chloride and benzoyl chloride; metal halides, such as titanium tetrachloride, aluminum chloride, and silicon chloride; and thionyl chloride. These acidic compounds may be used alone or in combination.

Among the processing agents used in Step (II) of the present invention, examples of (ii) basic compounds include, but are not limited to, alkali metal hydroxides, such as sodium hydroxide, potassium hydroxide, and lithium hydroxide; alkaline-earth metal hydroxides, such as calcium hydroxide, magnesium hydroxide, barium hydroxide, and cesium hydroxide; transition metal hydroxides, such as aluminum hydroxide and zinc hydroxide; alkali metal alcoholates, such as sodium methylate, sodium ethylate, sodium phenylate, lithium ethylate, and lithium butylate; alkaline-earth metal alcoholates, such as magnesium methylate and magnesium ethylate; metal hydrides, such as sodium hydride, lithium hydride, calcium hydride, lithium aluminum hydride, and sodium borohydride; and organometallic reagents, such as hydrosulfite, n-butyllithium, tert-butyllithium, ethylmagnesium bromide, and phenylmagnesium bromide. Furthermore, compounds which are converted into basic compounds in reaction with a small amount of water may also be used. Examples of such compounds include alkali metals, such as metallic lithium, metallic sodium, and metallic potassium; and alkaline-earth metals, such as metallic magnesium and metallic calcium.

Among the processing agents used in Step (II), examples of (iii) hydrogen-nitrogen bond-containing compounds include, but are not limited to, (iii-1) ammonia, (iii-2) hydrazine, (iii-3) primary amine compounds, (iii-4) secondary amine compounds, (iii-5) amide compounds, (iii-6) amine hydrochlorides, (iii-7) hydrogen-nitrogen bond-containing polymers, and (iii-8) hindered amine light stabilizers (HALSs).

Among the hydrogen-nitrogen bond-containing compounds, examples of (iii-3) primary amine compounds include, but are not limited to, N-(2-aminoethyl)ethanolamine, 12-aminododecanoic acid, 3-amino-1-propanol, allylamine, isopropylamine, 3,3'-iminobis(propylamine), monoethylamine, 2-ethylhexylamine, 3-(2-ethylhexyloxy)propylamine, 3-ethoxypropylamine, 3-(diethylamino)propylamine, 3-(dibutylamino)propylamine, n-butylamine, tert-butylamine, sec-butylamine, n-propylamine, 3-(methylamino)propylamine, 3-(dimethylamino)propylamine, N-methyl-3,3'-iminobis(propylamine), 3-methoxypropylamine, 2-aminoethanol, ethylenediamine, diethylenetriamine, triethylenetetramine, tetraethylenepentamine, pentaethylenehexamine, N-carboxy-4,4'-methylenebiscyclohexylamine, 1,4-diaminobutane, 1,2-diaminopropane, 1,3-diaminopropane, diaminomaleonitrile, cyclohexylamine, ATU (manufactured by Ajinomoto Co., Inc.), CTU Guanamine (manufactured by Ajinomoto Co., Inc.), thiourea dioxide, 2-hydroxyethylaminopropylamine, hexamethylenediamine, n-hexylamine, monomethylamine, monomethylhydrazine, 3-(lauroyloxy)propylamine, anisidine, aniline, p-aminoacetanilide, p-aminobenzoic acid, ethyl p-aminobenzoate ester, 2-amino-4-chlorophenol, 2-aminothiazole, 2-aminothiophenol, 2-amino-5-nitrobenzonitrile, aminophenol, p-aminobenzaldehyde, 4-aminobenzonitrile, anthranilic acid, 3-isopropoxyaniline, 4-amino-5-hydroxy-2,7-naphthalenesulfonic acid monosodium salt, 6-amino-4-hydroxy-2-naphthalenesulfonic acid, xylidine, m-xylylenediamine, p-cresidine, dianisidine, 4,4'-diaminostilbene-2,2'-disulfonic acid, 2-amino-5-naphthol-7-sulfonic acid, 1,4-diaminoanthraquinone, 4,4'-diamino-3,3'-diethyldiphenylmethane, 4,4'-diaminobenzanilide, diaminodiphenyl ether, 3,3'-dimethyl-4,4'-diaminodiphenylmethane, sulfanilic acid, tobias acid, 2,4,5-trichloroaniline, o-toluidine, toluidine, toluylenediamine, sodium naphthionate, nitroaniline, m-nitro-p-toluidine, o-chloro-p-toluidine-m-sulfonic acid, phenylhydrazine, phenylenediamine, phenetidine, phenethylamine, benzylamine, benzophenone hydrazine, mesidine, metanilic acid, 2-methyl-4-nitroaniline, leuco-1,4-diaminoanthraquinone, paramine, aminopyridine, 1-(2-aminoethyl)piperazine, N-(3-aminopropyl)morpholine, 1-amino-4-methylpiperazine, bis(aminopropyl)piperazine, benzoguanamine, melamine, o-chloroaniline, 2,5-dichloroaniline, 3,4-dichloroaniline, 3,5-dichloroaniline, 2-amino-4- chlorobenzoic acid, o-chloro-p-nitroaniline, 5-chloro-2-nitroaniline, 2,6-dichloro-4-nitroaniline, 2-(2-chlorophenyl) ethylamine, 3,3'-dichloro-4,4'-diaminodiphenylmethane, 3,3'-dichloro-4,4'-diaminobiphenyl, 2,4-difluoroaniline, o-fluoroaniline, N-β-(aminoethyl)-γ-aminopropyltrimethoxysilane, N-β-(aminoethyl)-γ-aminopropylmethyldimethoxysilane, and γ-aminopropyltriethoxysilane.

Among the hydrogen-nitrogen bond-containing compounds, examples of (iii-4) secondary amine compounds include, but are not limited to, N-methylethanolamine, diallylamine, diisopropylamine, diethylamine, diisobutylamine, di-2-ethylhexylamine, iminodiacetic acid, 3,3'-iminodipropionitrile, bis(hydroxyethyl)amine, N-ethylethylenediamine, ethyleneimine, dicyclohexylamine, 1,1-dimethylhydrazine, di-n-butylamine, di-tert-butylamine, dimethylamine, sodium N-methylacetate, N-ethylaniline, diphenylamine, dibenzylamine, 7-anilino-4-hydroxy-2-naphthalenesulfonic acid, N-methylaniline, 2-methyl-4-methoxydiphenylamine, imidazole, 2-methylimidazole, 2-ethyl-4-methylimidazole, 2-phenylimidazole, 2-undecylimidazole, 1,3-di(4-piperidyl) propane, 2,5-dimethylpiperazine, 2,6-dimethylpiperazine, 3,5-dimethylpyrazole, 5,5'-bi-1H-tetrazole, 5-phenyl-1H-tetrazole, 5-methyl-1H-tetrazole, 1,2,3,4-tetrahydroquinoline, (hydroxyethyl)piperazine, pipecoline, 2-(1-piperazinyl)pyrimidine, piperazine, piperidine, pyrrolidine, N-methylpiperazine, 2-methylpiperazine, and morpholine.

Among the hydrogen-nitrogen bond-containing compounds, examples of (iii-5) amide compounds include, but are not limited to, 2-acrylamido-2-methylpropanesulfonic acid, dihydrazide adipate, N-isopropylacrylamide, N-tert-octylacrylamide, carbohydrazides, guanylthiourea, glycylglycine, N-[3-(dimethylamino)propyl]acrylamide, N-[3-(dimethylamino)propyl]methacrylamide, N,N'-ethylenebis (stearoamide), amide oleate, amide stearate, N,N'-methylenebis(stearoamide), N-(hydroxymethyl) stearoamide, diacetone acrylamide, thioacetoamide, thiocarbohydrazide, thiosemicarbazide, thiourea, dihydrazide dodecanedioate, dihydrazide sebacate, dihydrazide isophthalate, 1,6-hexamethylenebis(N,N-dimethylsemicarbazide), formamide, methacrylamide, N,N'-methylenebis (acrylamide), N-methylolacrylamide, acetanilide, acetoacet-o-anisidide, acetoacetanilide, acetoacet-m-xylidide, acetoacet-o-chloroanilide, acetoacet-2,5-dimethoxy-4-chloroanilide, acetoacetic toluidide, 1,1,1',1'-tetramethyl-4,4'-(methylenedi-p-phenylene)disemicarbazide, toluene sulfonamide, p-hydroxyphenylacetamide, phthalimide, isocyanuric acid, 3-carbamoyl-2-pyrazine carboxylic acid, imide succinate, 5,5-dimethylhydantoin, 1,3-bis(hydrazinocarboethyl)-5-isopropylhydantoin, hydantoin, phenylpyrazolidone, 3-methyl-5-pyrazolone, 1-methylol-5,5-dimethylhydantoin, 3-(4-chlorophenyl)-1,1-dimethylurea, bromovalerylurea, 2,6-difluorobenzamide, and 2,2,2-trifluoroacetamide.

Among the hydrogen-nitrogen bond-containing compounds, examples of (iii-6) amine hydrochlorides include, but are not limited to, acetamidine hydrochloride, 2,2'-azobis-(2-amidinopropane)dihydrochloride, monomethylamine hydrochloride, dimethylamine hydrochloride, monoethylamine hydrochloride, diethylamine hydrochloride, monopropylamine hydrochloride, dipropylamine hydrochloride, monobutylamine hydrochloride, dibutylamine hydrochloride, semicarbazide hydrochloride, guanidine hydrochloride, aminoguanidine hydrochloride, 2-chloroethylamine hydrochloride, cysteamine hydrochloride, and tert-butyl hydrazine monohydrochloride.

Among the hydrogen-nitrogen bond-containing compounds, specific examples of (iii-7) hydrogen-nitrogen bond-containing polymers include, but are not limited to, POLYMENT (manufactured by Nippon Shokubai Co., Ltd.), poly (ethylene imine), amino poly(acryl amide), nylon 6, nylon 66, nylon 610, nylon 612, nylon 11, nylon 12, nylon MXD6, nylon 46, polyamide-imide, polyallylamine, and polyurethane.

Among the hydrogen-nitrogen bond-containing compounds, examples of (iii-8) hindered amine light stabilizers (HALSs) include, but are not limited to, Adekasutabu LA-77 (manufactured by Asahi Denka Co., Ltd.), Chimassorb 944LD (manufactured by Ciba Specialty Chemicals), Tinuvin 144 (manufactured by Ciba Specialty Chemicals), Adekasutabu LA-57 (manufactured by Asahi Denka Co., Ltd.), Adekasutabu LA-67 (manufactured by Asahi Denka Co., Ltd.), Adekasutabu LA-68 (manufactured by Asahi Denka Co., Ltd.), Adekasutabu LA-87 (manufactured by Asahi Denka Co., Ltd.), and Goodrite UV-3034 (manufactured by Goodrich Corporation).

In Step (II), the amount of the processing agent used is not particularly limited. When an acidic compound or basic compound is used as the processing agent, in view of ease of handling and reactivity, the amount used is preferably 0.01 to 100 parts by weight, more preferably 0.05 to 50 parts by weight, and most preferably 0.1 to 30 parts by weight based on 100 parts by weight of the thiocarbonylthio group-containing polymer (a2). When the polymer is treated with an acidic compound or basic compound, in view of stability of the resultant polymer, preferably, neutralization is carried out after treatment. When a hydrogen-nitrogen bond-containing compound is used as the processing agent, because of a high introduction rate of mercapto groups, the amount of the hydrogen-nitrogen bond-containing compound used is preferably 0.5 to 1,000 moles, and more preferably 1 to 500 moles, based on 1 mole of thiocarbonylthio group in the thiocarbonylthio group-containing polymer (a2). The excess hydrogen-nitrogen bond-containing compound can be recovered and reused.

Among the processing agents described above, preferred are hydrogen-nitrogen bond-containing compounds in view of no corrosion of apparatus and the fact that neutralization is not required. More preferred are hydrogen-nitrogen bond-containing compounds with a boiling point of 100° C. or less and HALSs in view of the fact that the purification step after treatment can be simplified. Most preferred are ammonia, monomethylamine, dimethylamine, monoethylamine, diethylamine, and HALSs in view of availability.

In Step (II), the reaction conditions are not particularly limited. For example, after the thiocarbonylthio group-containing polymer (a2) prepared in Step (I) is dissolved in an organic solvent, the processing agent may be added thereto. When the polymerization is carried out in water in Step (I), the processing agent may be added to the reaction solution. Alternatively, after the thiocarbonylthio group-containing polymer (a2) prepared in Step (I) is isolated, the processing agent may be added directly thereto. When an organic solvent is used, the organic solvents described above with reference to Step (I) may be used. In the case when the processing agent is directly added to the isolated polymer, in order to improve the reaction efficiency, preferably, melt kneading is performed using a twin-screw extruder, kneader, Plastomill, Banbury mixer, or the like. The reaction temperature is not particularly limited. In order to achieve high reaction efficiency, the reaction temperature is preferably in the range of −50° C. to 300° C., more preferably 0° C. to 200° C., and most preferably 30° C. to 150° C. However, when the processing agent is directly added to the polymer before melt kneading, the treatment is preferably performed at a temperature equal to or higher than the melting temperature of the polymer and less than the decomposition temperature of the polymer.

The production of the mercapto group-containing polymer (A) in Step (II) is illustrated below. When the thiocarbonylthio group-containing polymer (a2-1) is prepared using the thiocarbonylthio group-containing compound (1) in Step (I), as illustrated in Scheme 3, the polymer (a2-1) is allowed to react with a processing agent to convert the thiocarbonylthio group of the polymer (a2-1) into a mercapto group. A mercapto group-containing polymer (A-1) is thereby prepared. Herein, p is an integer of 1 or more. When p is 2 or higher, a polymer having a plurality of mercapto groups is prepared. For example, when p=2, a polymer having mercapto groups at both ends which is represented by HS-(a1)$_n$-R$^1$-(a1)$_n$-SH is prepared.

Scheme 3

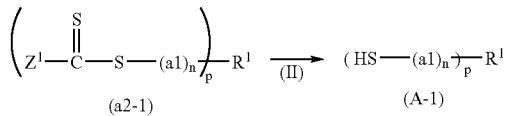

When the thiocarbonylthio group-containing polymer (a2-2) is prepared using the thiocarbonylthio group-containing compound (2) in Step (I), as illustrated in Scheme 4, the polymer (a2-2) is allowed to react with a processing agent to convert the thiocarbonylthio group of the polymer (a2-2) into a mercapto group. A mercapto group-containing polymer (A-2) is thereby prepared.

Scheme 4

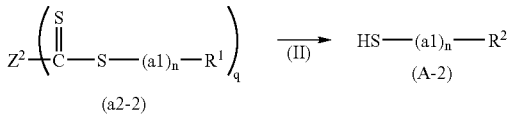

In the mercapto group-containing polymer (A) thus prepared, in view of the fact that the resultant cured object obtained from the composition containing the polymer (A) has excellent mechanical properties, such as modulus and elongation, the number-average molecular weight determined by gel permeation chromatography is preferably in the range of 2,000 to 100,000, and more preferably in the range of 3,000 to 50,000.

In the polymer (A), in view of ease of handling of the composition containing the polymer (A) and mechanical properties of the resultant cured object obtained from the composition, the molecular weight distribution determined by gel permeation chromatography is preferably 1.8 or less, and more preferably 1.5 or less.

In the present invention, gel permeation chromatography is carried out using a polystyrene gel column and using chloroform as an eluent. The molecular weight is calculated on the basis of a polystyrene standard sample. However, when the polymer has a low solubility in chloroform, the other eluent in which the polymer is highly soluble may be used as appropriate. For example, dimethylformamide is used for a polymer with a high acrylonitrile or methacrylonitrile content, and tetrahydrofuran is used for a polymer with a high vinyl chloride or vinylidene chloride content.

The polymer (A), which has at least one mercapto group at the molecular ends, preferably contains 50% by weight or more of a telechelic polymer having mercapto groups at both ends, and more preferably contains 80% by weight or more of the telechelic polymer.

[Compound Having at Least Two Mercapto Groups Per Molecule]

The component (B), i.e., the compound having at least two mercapto groups per molecule, contained in the curable composition of the present invention (hereinafter may be referred to as "mercapto group-containing compound (B)" or simply as "compound (B)"), is not particularly limited. Examples thereof include compounds having two mercapto groups per molecule, such as 1,2-dimercaptoethane, 1,3-dimercaptopropane, 1,4-dimercaptobutane, 2,3-dimercaptobutane, 1,5-dimercapto-3-thiapentane, 1,8-dimercapto-3,6-dioxaoctane, 2,5-dimercapto-1,3,4-thiadiazole, 1,8-dimercaptonaphthalene, 1,4-dimercapto-2,3-butanediol, 1,9-dimercaptononane, 2,3-dimercapto-1-propanol, 2,3-dimercaptosuccinic acid, 4,5-diamino-2,6-dimercaptopyrimidine, 2-mercaptoethyl ether, 1,5-pentanedithiol, 3,5-dichloro-1,2-benzenedithiol, 4-chloro-1,3-benzenedithiol, 1,2-benzenedithiol, 1,3-benzenedithiol, 1,4-benzenedithiol, ethylene glycol bis-thioglycolate, 1,6-hexanedithiol, 1,2-benzenedimethanethiol, 1,3-benzenedimethanethiol, 1,4-benzenedimethanethiol, 1,8-octanedithiol, durene-α$_1$,α$_2$-dithiol, 4,4'-thiobisbenzenethiol, ethanediol dithioglycolate, propanediol dithioglycolate, and butanediol dithioglycolate; compounds having at least three mercapto groups per molecule, such as 1,2,6-hexanetriol trithioglycolate, trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), trimethylolpropane trithioglycolate, and pentaerythritol tetrathioglycolate; and liquid polysulfide polymers, such as Thiokol LP (manufactured by Toray Thiokol Co., Ltd.). These may be used alone or in combination. Among these compounds, in view of quicker effects and that the resultant cured objects have excellent strength, preferred are the compounds having at least three mercapto groups per molecule. In view of availability, more preferred are trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), trimethylolpropane trithioglycolate, and pentaerythritol tetrathioglycolate.

The amount of the compound (B) having at least two mercapto groups per molecule used is not particularly limited, but is preferably 0.01 to 30 parts by weight, and more preferably 0.1 to 20 parts by weight, based on 100 parts by weight of the mercapto group-containing polymer (A) because of excellent mechanical properties, such as strength and elongation, of the resultant cured objects.

[Oxidizing Agent]

The component (C), i.e., the oxidizing agent (hereinafter may be referred to as "oxidizing agent (C)"), contained in the curable composition of the present invention is not particularly limited. Examples thereof include inorganic peroxides, such as lead dioxide, manganese dioxide, calcium peroxide, zinc peroxide, barium peroxide, sodium peroxide, potassium peroxide, strontium peroxide, and sodium carbonate peroxide; metal oxides, such as zinc oxide, lead oxide, manganese oxide, calcium oxide, barium oxide, ferrous oxide, ferric oxide, cobalt oxide, copper oxide, and vanadium pentoxide; inorganic oxidizing agents, such as potassium bichromate, sodium perchlorate, and potassium permanganate; organic peroxides, such as benzoylperoxide, dicumylperoxide, cumene hydroperoxide, tert-butylhydroperoxide, tert-butylperbenzoate, sodium peracetate, and urea peroxide; organic oxidizing agents, such as nitrobenzene, dinitrobenzene, and para-quinone dioxime; organic metallic compounds, such as potassium hexacyanoferrate(III), organoferrate(III), and manganese tris(acetylacetonate); hydrogen peroxide; and oxygen (air). These may be used alone or in combination. Among these oxidizing agents, in view of ease of handling and availability, preferred are lead dioxide, zinc peroxide, calcium peroxide, barium peroxide, manganese dioxide, bichromates, hydrogen peroxide, and oxygen (air). More preferred are lead dioxide, zinc peroxide, calcium peroxide, barium peroxide, manganese dioxide, and bichromates. Most preferred are lead dioxide and calcium peroxide.

The amount of the oxidizing agent (C) used is not particularly limited, but is preferably 0.01 to 40 parts by weight, and more preferably 0.1 to 20 parts by weight, based on 100 parts by weight of the polymer as the component (A) in view of the fact that curing proceeds rapidly. Additionally, when oxygen (air) is used as the oxidizing agent, the amount to be added is not particularly limited.

[Additives]

The curable composition of the present invention, as necessary, contains additives besides the mercapto group-containing polymer (A), the mercapto group-containing compound (B), and the oxidizing agent (C).

The additive that can be incorporated in the curable composition of the present invention is not particularly limited. Examples of additives include [1] curing accelerators, [2] plasticizers, [3] fillers, [4] pigments, [5] reinforcing agents, [6] curing rate controllers, [7] anti-sagging agents, [8] adhesion-imparting agents, [9] colorants, [10] ultraviolet absorbers, and [11] antioxidants.

Examples of [1] curing accelerators suitable for use include tertiary amines and metal salts. Among them, examples of tertiary amines include, but are not limited to, trialkylamines, such as triethylamine, tripropylamine, and tributylamine; N,N,N',N'-tetramethylethylenediamine, N,N,N',N'-tetramethylpropane-1,3-diamine, tetramethylguanidine, N,N'-dimethylpiperazine, dimethylaminoethanol, 1,8-diazabicyclo[5.4.0]-7-undecene, 1,4-diazabicyclo[2.2.2]octane, and bis(2-dimethylaminoethyl)ether. These may be used alone or in combination. When a tertiary amine is used as the curing accelerator, the amount of the tertiary amine used is not particularly limited, but is preferably 0.01 to 30 parts by weight, and more preferably 0.1 to 15 parts by weight, based on 100 parts by weight of the mercapto group-containing polymer (A) because of an excellent balance of the amount added and the accelerating effect achieved by the addition.

The metal salts are suitably used when oxygen (air) is used as the oxidizing agent (C). Examples of metal salts include, but are not limited to, chlorides, iodides, sulfates, and nitrates of copper, iron, cobalt, nickel, palladium, and the like. These metal salts may be used alone or in combination. The amount of the metal salt used is not particularly limited, but is preferably 0.01 to 30 parts by weight, and more preferably 0.1 to 20 parts by weight, based on 100 parts by weight of the mercapto group-containing polymer (A) because of the accelerating effect and an excellent balance of the amount added and the accelerating effect achieved by the addition. In such a case, it is also possible to use the metal salt and the tertiary amine in combination.

Examples of [2] plasticizers include, but are not limited to, phthalic esters, such as dimethyl phthalate, diethyl phthalate, dibutyl phthalate, dioctyl phthalate, di-2-ethylhexyl phthalate, diisononyl phthalate, octyldecyl phthalate, diisodecyl phthalate, and butyl benzyl phthalate; chlorinated paraffins; glycol esters, such as diethylene glycol dibenzoate and triethylene glycol di-2-ethylbutyrate; phosphate esters, such as tributyl phosphate, tri-2-ethylhexyl phosphate, triphenyl phosphate, and tricresyl phosphate; fatty acid esters, such as butyl oleate, glycerol monooleate ester, dibutyl adipate, di-n-hexyl adipate, di-2-ethylhexyl adipate, Alkyl Adipate 610 (manufactured by Kyowa Hakko Kogyo Co., Ltd.), di-2-ethylhexyl azelate, dibutyl sebacate, and di-2-ethylhexyl sebacate; and oxy acid esters, such as methyl acetyl ricinoleate, butyl acetyl ricinoleate, butyl phthalyl butyl glycolate, and tributyl acetylcitrate. Among these compounds, in view of versatility, preferred are phthalic esters, chlorinated paraffins, and glycol esters.

Examples of [3] fillers include, but are not limited to, carbon black, calcium carbonate, and clay.

With respect to [4] pigments, any desired pigment can be used depending on the applications.

Examples of [5] reinforcing agents include kaolin clay, silica sand, silica stone, and talc.

Examples of [6] curing rate controllers include, but are not limited to, sulfur, amines, water, stearic acid, and stearate salts.

Examples of [7] anti-sagging agents include, but are not limited to, fine silica powder and organic bentonite.

Examples of [8] adhesion-imparting agents include, but are not limited to, modified phenolic resins, organosilane, and epoxy resins.

Examples of [9] colorants include, but are not limited to, titanium dioxide, carbon black, and red iron oxide.

Examples of [10] ultraviolet absorbers include, but are not limited to, salicylic acid-based ultraviolet absorbers, such as phenyl salicylate, p-tert-butylphenyl salicylate, and p-octylphenyl salicylate; benzophenone-based ultraviolet absorbers, such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,41-dimethoxybenzophenone, 2-hydroxy-4-methoxy-5-sulfobenzophenone, and bis(2-methoxy-4-hydroxy-5-benzoylphenyl)methane; benzotriazole-based ultraviolet absorbers, such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, 2-(2'-hydroxy-4'-octoxyphenyl)benzotriazole, 2-[2'-hydroxy-3'-(3",4",5",6"-tetrahydrophthalimidemethyl)-5'-methylphenyl]benzotriazole, 2,2-methylenebis[4-(1,1,3,3,-tetramethylbutyl)-6-(2H-benzotriazole-2-yl)phenol], [2-(2'-hydroxy-5'-methacryloxyphenyl)-2H-benzotriazole], and [2,2'-methylenebis[4-(1,1,3,3-tetramethylbutyl)-6-[(2H-benzotriazole-2-yl)phenol]]]; cyano acrylate-based ultraviolet absorbers, such as 2-ethylhexyl-2-cyano-3,3'-diphenyl acrylate, and ethyl-2-cyano-3,3'-diphenyl acrylate; nickel-based ultraviolet stabilizers, such as nickel bis(octylphenyl) sulfide, [2,2'-thiobis(4-tert-octylphenolate)]-n-butylamine nickel, nickel complex-3,5-di-tert-butyl-4-hydroxybenzyl-monoethylate phosphate, and nickel-dibutyldithiocarbamate; and HALSs, such as bis(2,2,6,6,-tetramethyl-4-piperidyl)sebacate, Sanol LS-770 (manufactured by Sankyo Organic Chemicals Co., Ltd.), Adekasutabu LA-77 (manufactured by Asahi Denka Co., Ltd.), Sumisorb 577 (manufactured by Sumitomo Chemical Co., Ltd.), Biosorb 04 (manufactured by Kyodo Chemical Co., Ltd.), Chimassorb 944LD (manufactured by Ciba Specialty Chemicals), Tinuvin 144 (manufactured by Ciba Specialty Chemicals), Adekasutabu LA-52 (manufactured by Asahi Denka Co., Ltd.), Adekasutabu LA-57 (manufactured by Asahi Denka Co., Ltd.), Adekasutabu LA-67 (manufactured by Asahi Denka Co., Ltd.), Adekasutabu LA-68 (manufactured by Asahi Denka Co., Ltd.), Adekasutabu LA-77 (manufactured by Asahi Denka Co., Ltd.), Adekasutabu LA-87 (manufactured by Asahi Denka Co., Ltd.), Adekasutabu PEP-36 (manufactured by Asahi Denka Co., Ltd.), and Goodrite UV-3034 (manufactured by Goodrich Corporation).

Examples of [11] antioxidants include, but are not limited to, phenol antioxidants, such as 2,6-di-tert-butyl-p-cresol, butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraoxaspiro[5,5]undecane, 1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis-[methylene-3-(3',5'-di-tert-butyl-4'-hydroxyphenyl)propionate]methane, bis[3,3'-bis(4'-hydroxy-3'-tert-butylphenyl)butylic acid]glycol ester, 1,3,5-tris(3',5'-di-tert-butyl-4'-hydroxybenzyl)-S-triazine-2,4,6-(1H,3H,5H)trione, and tocopherols; sulfur-based antioxidants, such as dilauryl 3,3'-thiodipropionate, dimyristoyl 3,3'-thiodipropionate, and distearyl 3,3'-thiodipropionate; and phosphorus-based antioxidants, such as triphenyl phosphite, diphenylisodecyl phosphite, 4,4'-butylidene-bis(3-methyl-6-tert-butylphenylditridecyl)phosphite, cyclicneopentanetetraylbis(octadecyl phosphite), tris(nonylphenyl)phosphite, tris(monononylphenyl)phosphite, tris(dinonylphenyl)phosphite, diisodecylpentaerythritol diphosphite, 9,10-dihydro-9-oxa-10-phosphaphenanthrene-10-oxide, 10-(3,5-di-tert-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-tert-butylphenyl)phosphite, cyclicneopentanetetraylbis(2,4-di-tert-butylphenyl)phosphite, cyclicneopentanetetraylbis(2,6-di-tert-butyl-4-methylphenyl)phosphite, and 2,2-methylenebis(4,6-di-tert-butylphenyl)octyl phosphite.

[Curable Composition]

The curable composition of the present invention contains the mercapto group-containing polymer (A), the mercapto group-containing compound (B), the oxidizing agent (C), and as necessary, additives, such a curing accelerator. When these components are mixed, all the compositions may be premixed to produce a one-part curable composition. Alternatively, the components may be separated into a base resin and a curing agent to produce a two-part curable composition, and the base resin and the curing agent are mixed immediately before being cured. When a base resin and a curing agent are separated, preferably, for example, the polymer (A) and the compound (B) are mixed to form the base resin and the oxidizing agent (C) is treated as the curing agent in view of storage stability. In such a case, in order to facilitate the mixing of the base resin and the curing agent, a small amount of organic solvent may be used.

When the individual components are mixed, the method of mixing is not particularly limited. Mixing may be performed using an organic solvent, or the individual components may be directly mixed without using a solvent. A kneader, roller, mixer, or the like may be used for mixing. Alternatively, mixing may be performed manually.

By mixing the individual components, the mercapto groups of the mercapto group-containing polymer (A) and the mercapto group-containing compound (B) are oxidized, and the polymer (A) and the compound (B) are coupled to each other via disulfide bonds. For example, as illustrated in scheme 5, when the polymer (A) is a polymer with one mercapto group (A-1, wherein p=1), the polymer (A) is coupled to a compound with two mercapto groups (B-1; represented by HS-b-SH in the scheme) to produce a polymer ($A_0$-1) having a structure shown below. When the polymer (A) is a polymer with two mercapto groups (A-1, wherein p=2), the polymer (A) and the compound (B) are sequentially bonded to produce a long-chain polymer ($A_0$-2) (wherein m is the number of repeats). When the polymer (A) is a polymer with two mercapto groups (A-1, wherein p=2) and when the compound (B) has at least three mercapto groups, a network polymer is produced by reaction between the polymer (A) and the compound (B).

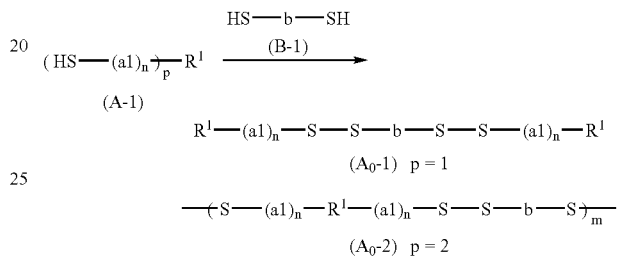

In the present invention, by selecting the monomers and reaction conditions depending on the applications, a thiocarbonylthio group-containing polymer (a2) having desired properties can be prepared. Since the polymer (a2) is prepared using the thiocarbonylthio group-containing compound, it is possible to easily control the molecular weight and molecular weight distribution. Consequently, it is possible to produce a curable composition with desired properties using the polymer (A) derived from the thiocarbonylthio group-containing polymer (a2), the compound (B) having at least two mercapto groups per molecule, and the oxidizing agent (C). In the present invention, as described above, since the molecular weight and molecular weight distribution can be easily controlled, it is possible to accurately control the physical properties, such as moduli and elongation, of cured objects, which are affected by the molecular weight and molecular weight distribution of the polymer.

The curable compositions of the present invention can be used in various fields, for example, as sealants, coating materials, lining materials, hose materials, packings, gaskets, printing rollers, cold casting materials, pressure-sensitive adhesives, adhesives, various molded objects, resin modifiers, textile modifiers, modifiers for paint, and softeners.

BEST MODE FOR CARRYING OUT THE INVENTION

While the present invention will be described based on the examples below, it is to be understood that the invention is not limited to these examples.

In the examples, the weight-average molecular weight (Mw), number-average molecular weight (Mn), and molecular weight distribution (Mw/Mn) were determined by gel permeation chromatography (GPC). In the GPC, chloroform was used as an eluent, and a polystyrene gel column was used. The analysis was carried out on the basis of polystyrene.

Production Example 1

Production of n-butyl acrylate-2-methoxyethyl Acrylate Copolymer Having Mercapto Groups at Both Ends Into a 2-L reactor equipped with an agitator, a thermometer, a nitrogen gas inlet tube, a reflux condenser tube, and a dropping funnel, was placed 410 mg of sodium dodecyl sulfate as an emulsifier, 20 g of NONION NS-270 (HLB=18.7, manufactured by NOF Corp.) as an emulsifier, and 800 g of distilled water, and the reactor was nitrogen-purged while the reaction mixture was being stirred at 80-C. As a thiocarbonylthio group-containing compound, 46.68 g of a compound represented by formula (4):

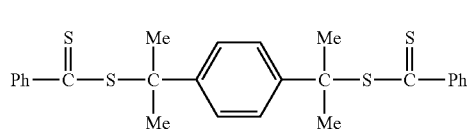

(4)

(wherein Me represents methyl and Ph represents phenyl), was dissolved in 100 g of n-butyl acrylate as a monomer, and the solution was added into the reactor, followed by stirring at 80° C. for 20 minutes under nitrogen flow. As a polymerization initiator, 14.0 g of 4,4'-azobis(4-cyanovaleric acid) together with 50 g of distilled water was added into the reactor. Stirring was performed at 80° C. for 30 minutes, and then a mixed solution of 200 g of n-butyl acrylate and 100 g of 2-methoxyethyl acrylate was dripped for over 2 hours. Stirring was further performed at 80° C. for 6 hours, and the emulsion was then cooled to room temperature. A salting-out method was performed, followed by filtration, washing, and drying. Thereby, an n-butyl acrylate-2-methoxyethyl acrylate copolymer having thiocarbonylthio groups at both ends was produced. GPC confirmed that in the polymer, Mw=4,520, Mn=4,070, and Mw/Mn=1.11. $^1$H NMR analysis confirmed that the introduction rate of thiocarbonylthio groups was 97% on the both-ends basis.

The polymer having thiocarbonylthio groups at both ends (375 g) was dissolved in 800 mL of toluene, and 35 g of monoethylamine as a processing agent was added thereinto, followed by stirring at 5° C. for 12 hours. The temperature of the reaction solution was increased to 80° C. to remove the excess monoethylamine by distillation and to 120° C. to remove toluene by distillation under reduced pressure. A polymer (378 g) was thereby produced. GPC confirmed that Mw=4,490, Mn=4,010, and Mw/Mn=1.12. $^1$H NMR analysis and IR analysis confirmed that the resultant polymer was an n-butyl acrylate-2-methoxyethyl acrylate copolymer having mercapto groups at both ends.

Production Example 2

Production of poly(n-butyl acrylate) Having Mercapto Groups at Both Ends

Into a 1-L reactor equipped with an agitator, a thermometer, a nitrogen gas inlet tube, and a reflux condenser tube, was placed 181 g of n-butyl acrylate as a monomer, 40 mg of 1,1'-azobis(cyclohexane-1-carbonitrile) as a polymerization initiator, 635 mg of a compound represented by formula (5):

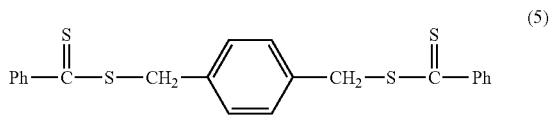

(5)

(wherein Ph represents phenyl), as a thiocarbonylthio group-containing compound, and 300 mL of toluene, and the reactor was nitrogen-purged. The reaction solution was heated at 90° C. for 5 hours while being stirred. Sampling was performed and GPC confirmed that in the resultant polymer, Mw=77,000, Mn=56,900, and Mw/Mn=1.35. $^1$H NMR analysis confirmed that thiocarbonylthio groups were introduced at both ends of poly(n-butyl acrylate), and the introduction rate was 93% on the both-ends basis. The reaction rate of n-butyl acrylate was 55%.

The resultant poly(n-butyl acrylate) having thiocarbonylthio groups at both ends was dissolved in toluene, and 50 g of diethylamine as a processing agent was added thereinto, followed by stirring at 50° C. for 10 hours. The temperature of the reaction solution was increased to 120° C. to remove the excess diethylamine and then toluene by distillation under reduced pressure. GPC confirmed that in the resultant polymer, MW=76,600, Mn=56,000, and Mw/Mn=1.37. $^1$H NMR analysis and IR analysis confirmed that the resultant polymer was poly(n-butyl acrylate) having mercapto groups at both ends.

Production Example 3

Production of poly(n-butyl acrylate) Having Mercapto Groups at Both Ends

Into a 1-L reactor equipped with an agitator, a thermometer, a nitrogen gas inlet tube, and a reflux condenser tube, was placed 271.5 g of n-butyl acrylate as a monomer, 60 mg of 1,1'-azobis(cyclohexane-1-carbonitrile) as a polymerization initiator, 2.10 g of a compound represented by formula (5):

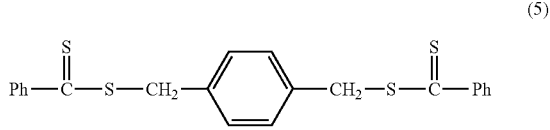

(5)

(wherein Ph represents phenyl), as a thiocarbonylthio group-containing compound, and 430 mL of toluene, and the reactor was nitrogen-purged. The reaction solution was heated at 90° C. for 10 hours while being stirred. Toluene was removed by distillation from the reaction solution, and the resultant polymer was dried under reduced pressure. GPC confirmed that in the resultant polymer, Mw=55,200, Mn=43,500, and Mw/Mn=1.27. $^1$H NMR analysis confirmed that the resultant polymer was poly(n-butyl acrylate) having thiocarbonylthio groups at both ends. The introduction rate of thiocarbonylthio groups was 96% on the both-ends basis.

To 100 parts by weight of the poly(n-butyl acrylate) was added 15 parts by weight of Adekasutabu LA-77 (manufactured by Asahi Denka Co., Ltd.) as a processing agent, and kneading was performed using a three roller mill at 150° C. for 20 minutes. GPC confirmed that in the resultant polymer, MW=53,700, Mn=42,900, and Mw/Mn=1.25. ¹H NMR analysis and IR analysis confirmed that the resultant polymer was poly(n-butyl acrylate) having mercapto groups at both ends.

Production Example 4

Production of Methyl methacrylate-n-butyl Acrylate Copolymer Having Mercapto Group at One End Into a 1-L reactor equipped with an agitator, a thermometer, a nitrogen gas inlet tube, a dropping funnel, and a reflux condenser tube, was placed 330 mg of sodium dodecyl sulfate as an emulsifier and 300 g of distilled water, and the reactor was nitrogen-purged while the reaction mixture was being stirred at 80-C. As a thiocarbonylthio group-containing compound, 651 mg of a compound represented by formula (6):

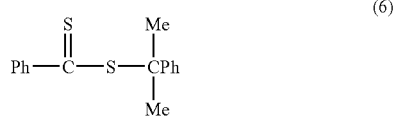

(6)

(wherein Me represents methyl and Ph represents phenyl), was dissolved in 3.0 g of methyl methacrylate as a monomer, and the solution was added into the reactor. After 20 minutes, as a polymerization initiator, 555 mg of 4,4'-azobis(4-cyanovaleric acid) together with 12 g of distilled water was added into the reactor. Stirring was performed at 80° C. for 20 minutes, and then 52.0 g of methyl methacrylate was dripped from the dropping funnel for over 90 minutes. After 30 minutes, 61.0 g of n-butyl acrylate as a monomer was dripped from the dropping funnel for over 1 hour. Stirring was performed at 80° C. for 6 hours, and the emulsion was salted out with calcium carbonate, followed by washing with distilled water. Thereby, 94.1 g of a methyl methacrylate-n-butyl acrylate diblock copolymer was produced. GPC confirmed that in the polymer, Mw=59,800, Mn=44,400, and Mw/Mn=1.35. ¹H NMR analysis confirmed that the weight ratio of the poly(methyl methacrylate) portion to the poly(n-butyl acrylate) portion was 48:52, and that thiocarbonylthio groups were introduced at the poly(n-butyl acrylate) ends with an introduction rate of 84%.

The diblock copolymer (93 g) was placed in a 300-mL reactor. Toluene (300 mL) was added thereto and the diblock copolymer was dissolved. Diethylamine (18 g) was added thereto, followed by stirring at 50° C. for 8 hours. The excess diethylamine and toluene were removed by distillation under reduced pressure. ¹H NMR analysis and IR analysis confirmed the production of a methyl methacrylate-n-butyl acrylate diblock copolymer having mercapto groups at the poly (n-butyl acrylate) ends. GPC confirmed that in the copolymer, Mw=58,400, Mn=44,200, and Mw/Mn=1.32.

Example 1

The mercapto group-containing polymer (A) produced in Production Example 1, a mercapto group-containing compound (B), and an oxidizing agent (C) were compounded at the weight ratio shown in Table 1 below. With respect to this mixture (composition), the tack-free time was measured, and the curing rate in the inner regions and the paint film non-staining properties were evaluated. The tack-free time was measured by the probe tack test method according to ASTM D-2979-88. In order to evaluate the curing rate in the inner regions, the composition was placed in a container with a recess which has the same shape as that of the slump container according to JIS A5758 and left to stand at 20-C for three days, and then the depth of the cured region from the surface was measured. In order to evaluate the paint film non-staining properties, the composition was formed into a sheet with a thickness of 3 mm, and after the sheet was cured, the sheet was coated with paint A (New Bodelac 200, phthalic acid-based paint, manufactured by Nippon Paint Co., Ltd.), paint B Nippe Tilelac EMA-S, acrylic emulsion paint, manufactured by Nippon Paint Co., Ltd.), and paint C (Nissan Urethane No. 1500, polyurethane paint, manufactured by NOF Corp.). After three months, the state of each paint film was observed. The evaluation results are shown in Table 1. The results of Examples 2 to 20 and Comparative Examples 1 to 5 are also shown in Table 1. (In Table 1, with respect to the paint film non-staining properties, represents not being stained, D represents the paint film being slightly softened or discolored, and x represents the paint film being softened or discolored.)

Examples 2 to 20

The mercapto group-containing polymer (A) produced in any one of Production Examples 1 to 4, a mercapto group-containing compound (B), an oxidizing agent (C), and as necessary, a curing accelerator, a metal salt (used as a curing accelerator), and other additives were compounded at the weight ratio shown in Table 1. Evaluations were carried out as in Example 1. Additionally, in Examples 19 and 20, 10 parts by weight of xylene was used as a solvent when the individual components were compounded.

Comparative Examples 1 to 5

As Comparative Examples, compositions were prepared as in Example 1 using commercially available polysulfide polymers shown in Table 1, and evaluations were carried out.

Followings are what the abbreviations in Table stand for:
LP=Thiokol LP-280 (manufactured by Toray Thiokol Co., Ltd.); P500=Permapol P-2 Polymer P-500 (manufactured by Nippon Shokubai Co., Ltd.); TPMP=trimethylolpropane tris (3-mercaptopropionate); PTMP=pentaerythritol tetrakis(3-mercaptopropionate); TPMA=trimethylolpropane tris(2-mercaptoacetate); PTMA=pentaerythritol tetrakis(2-mercaptoacetate); TPTG=trimethylolpropane trithioglycolate; PTG=pentaerythritol tetrathioglycolate; DFe=ferric dimethyldithiocarbamate salt; DBU=1,8-diazabicyclo[5.4.0]-7-undecene; DOP=dioctyl phthalate; DIP=diisodecyl phthalate

TABLE 1

| | (a) (parts by weight) | (b) (parts by weight) | (c) (parts by weight) | Curing accelerator (parts by weight) | Metal salt (parts by weight) | Additive (parts by weight) | Tack-free time (hour) | Curing properties in inner regions (mm) | Paint film non-staining properties Paint A | Paint B | Paint C |
|---|---|---|---|---|---|---|---|---|---|---|---|
| Example 1 | Production Example 1 100 | TPMP 10 | PbO2 8 | — | — | — | 4 | 5.6 | ○ | ○ | ○ |
| Example 2 | Production Example 1 100 | TPMP 10 | PbO2 8 | DBU 4 | — | — | 3.2 | 6.1 | ○ | ○ | ○ |
| Example 3 | Production Example 1 100 | TPMP 10 | (Air) | DBU 4 | Copper chloride 8 | — | 6.1 | 3.9 | ○ | ○ | ○ |
| Example 4 | Production Example 1 100 | TPMP 10 | PbO2 8 | — | — | DOP 10 | 4.6 | 5.2 | ○ | ○ | ○ |
| Example 5 | Production Example 1 100 | LP 80 | PbO2 15 | — | — | DOP 20 | 5.5 | 4.3 | ○ | ○ | ○ |
| Example 6 | Production Example 2 100 | TPMP 5 | PbO2 7.5 | — | — | — | 4.5 | 4.7 | ○ | ○ | ○ |
| Example 7 | Production Example 2 100 | TPMP 5 | PbO2 7.5 | — | — | DOP 20 | 4.6 | 4.6 | ○ | ○ | ○ |
| Example 8 | Production Example 2 100 | TPMP 5 | PbO2 7.5 | DBU 4 | — | DOP 20 | 4.2 | 4.9 | ○ | ○ | ○ |
| Example 9 | Production Example 2 100 | TPMP 5 | CaO2 8 | — | Copper chloride 8 | — | 5.1 | 3.8 | ○ | ○ | ○ |
| Example 10 | Production Example 2 100 | TPMP 5 | CaO2 8 | — | Copper chloride 8 | DOP 20 | 4.8 | 4 | ○ | ○ | ○ |
| Example 11 | Production Example 2 100 | PTMP 3 | PbO2 7.5 | — | — | — | 4 | 5 | ○ | ○ | ○ |
| Example 12 | Production Example 2 100 | PTMP 3 | PbO2 7.5 | — | — | DOP 20 | 3.9 | 5 | ○ | ○ | ○ |
| Example 13 | Production Example 3 100 | TPMP 5 | PbO2 7.5 | — | — | DOP 20 | 4.6 | 4.8 | ○ | ○ | ○ |
| Example 14 | Production Example 3 100 | PTMP 3 | PbO2 7.5 | — | — | DOP 20 | 4.1 | 5.2 | ○ | ○ | ○ |
| Example 15 | Production Example 3 100 | TPMP 5 | PbO2 7.5 | — | — | DOP 20 | 4.3 | 5 | ○ | ○ | ○ |
| Example 16 | Production Example 3 100 | PTMA 3 | PbO2 7.5 | — | — | DOP 20 | 4 | 5.5 | ○ | ○ | ○ |
| Example 17 | Production Example 3 100 | TPTG 5 | PbO2 7.5 | — | — | DOP 20 | 4.2 | 5.5 | ○ | ○ | ○ |
| Example 18 | Production Example 3 100 | PTG 3 | PbO2 7.5 | — | — | DOP 20 | 3.8 | 6 | ○ | ○ | ○ |
| Example 19 | Production Example 4 100 | TPMA 5 | PbO2 5 | — | — | DOP 100 | 0.4 | >10 | ○ | ○ | ○ |
| Example 20 | Production Example 4 100 | TPMA 5 | (Air) | — | — | DOP 100 | 0.9 | >10 | ○ | ○ | ○ |
| Comparative Example 1 | LP 100 | TPMP 10 | PbO2 8 | — | — | — | 6.7 | 3.3 | Δ | ○ | ○ |
| Comparative Example 2 | LP 100 | TPMP 10 | PbO2 8 | DBU 4 | — | — | 6.2 | 3.8 | Δ | ○ | ○ |
| Comparative Example 3 | LP 100 | TPMP 10 | PbO2 8 | — | — | DOP 20 | 6.9 | 3.1 | x | x | x |
| Comparative Example 4 | P500 100 | TPMP 10 | DFe 0.5 | — | — | DIP 60 | 5.9 | 2.2 | x | x | x |

TABLE 1-continued

|  | (a) (parts by weight) | (b) (parts by weight) | (c) (parts by weight) | Curing accelerator (parts by weight) | Metal salt (parts by weight) | Additive (parts by weight) | Tack-free time (hour) | Curing properties in inner regions (mm) | Paint film non-staining properties Paint A | Paint B | Paint C |
|---|---|---|---|---|---|---|---|---|---|---|---|
| Comparative Example 5 | P500 100 | TPMP 10 | DFe 0.5 | — | — | DOP 60 | 6.2 | 2.4 | x | x | x |

As is evident from Table 1, compositions in Examples of the present invention have shorter tack-free time, superior curing properties, higher curing rates in the inner regions, and superior paint film non-staining properties compared to the compositions in Comparative Examples.

The curable compositions of the present invention are excellent in curing properties, have high curing rates in the inner regions during curing, and cured objects from the curable compositions do not substantially discolor or soften finishing agents or coating materials applied to the surfaces thereof. Since it is possible to control the molecular weights and molecular weight distributions of the polymer components in the compositions, the physical properties of the resultant curable objects can be easily regulated.

INDUSTRIAL APPLICABILITY

These compositions can be used in various fields, for example, as sealants, coating materials, lining materials, hose materials, packings, gaskets, printing rollers, cold casting materials, pressure-sensitive adhesives, adhesives, various molded objects, resin modifiers, textile modifiers, modifiers for paint, and softeners.

The invention claimed is:

1. A curable composition comprising:
a polymer (A) having at least one mercapto group at the molecular ends, the polymer (A) being derived from a thiocarbonylthio group-containing polymer (a2) prepared by polymerizing a monomer (a1) which contains an acrylic ester as a principal component and which contains 50% by weight or more of the acrylic ester and less than 50% by weight of a monomer copolymerizable with the acrylic ester in the presence of a thiocarbonylthio group-containing compound, wherein the thiocarbonylthio group-containing compound is at least one compound selected from the group consisting of a compound represented by general formula (1):

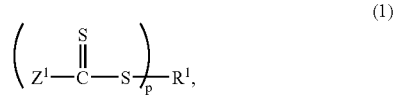

wherein $R^1$ is a p-valent organic group of 1 or more carbon atoms which may contain one or more of nitrogen, oxygen, sulfur, halogen, silicon, phosphorus, and metal atoms; $Z^1$ is a hydrogen atom, halogen atom, or monovalent organic group of 1 or more carbon atoms which may contain one or more of nitrogen, oxygen, sulfur, halogen, silicon, and phosphorus atoms; wherein

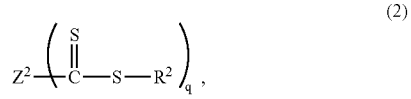

is different from $R^1$; when plural $Z^1$s are present, the plural $Z^1$s may be the same or different; and p is an integer of 1 or more,
a compound represented by general formula (2):

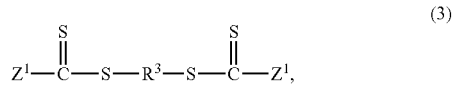

wherein $R^2$ is a monovalent organic group of 1 or more carbon atoms which may contain one or more of nitrogen, oxygen, sulfur, halogen, silicon, phosphorus, and metal atoms; $Z^2$ is a sulfur atom when q=2, an oxygen atom when q=2, a nitrogen atom when q=3, or q-valent organic group of 1 or more carbon atoms which may contain one or more of nitrogen, oxygen, sulfur, halogen, silicon, and phosphorus atoms; plural $R^2$s may be the same or different; and q is an integer of 2 or more, and a compound represented by general formula (3):

$$Z^1-\overset{S}{\underset{\|}{C}}-S-R^3-S-\overset{S}{\underset{\|}{C}}-Z^1, \qquad (3)$$

wherein $R^3$ is a divalent organic group of 1 or more carbon atoms which may contain one or more of nitrogen, oxygen, sulfur, halogen, silicon, phosphorus, and metal atoms; each $Z^1$ is a hydrogen atom, halogen atom, or monovalent organic group of 1 or more carbon atoms which may contain one or more of nitrogen, oxygen, sulfur, halogen, silicon, and phosphorus atoms; and the two $Z^1$s may be the same or different, wherein the molecular weight distribution of the mercapto group-containing polymer (A) is 1.8 or less, the molecular weight distribution being determined by gel permeation chromatography;
a compound (B), wherein compound (B) is different from polymer (A); having at least two mercapto groups per molecule; and
an oxidizing agent (C).

2. The curable composition according to claim 1, wherein the monomer (a1) containing the acrylic ester as the principal component contains 80% by weight or more of the acrylic ester and less than 20% by weight of the monomer copolymerizable with the acrylic ester.

3. The curable composition according to claim 1, wherein the number-average molecular weight of the mercapto group-containing polymer (A) is in the range of 2,000 to 100,000, the number-average molecular weight being determined by gel permeation chromatography.

4. The curable composition according to claim 1, wherein the mercapto group-containing polymer (A) contains 50% by weight or more of a telechelic polymer having mercapto groups at both molecular ends.

5. The curable composition according to claim 1, wherein the acrylic ester is an acrylic ester of an alcohol with 1 to 10 carbon atoms.

6. The curable composition according to claim 1, wherein the monomer copolymerizable with the acrylic ester is at least one compound selected from the group consisting of methacrylic esters, styrene, acrylonitrile, methacrylonitrile, vinyl chloride, vinylidene chloride, vinyl acetate, butadiene, isoprene, and chloroprene.

7. The curable composition according to claim 1, wherein the compound (B) having at least two mercapto groups per molecule is a compound having at least three mercapto groups per molecule.

8. The curable composition according to claim 1, wherein the oxidizing agent (C) is at least one compound selected from the group consisting of lead dioxide, zinc peroxide, calcium peroxide, barium peroxide, manganese dioxide, and bichromates.

9. The curable composition according to claim 1, further comprising at least one additive selected from the group consisting of curing accelerators, plasticizers, fillers, curing rate controllers, anti-sagging agents, adhesion-imparting agents, colorants, ultraviolet absorbers, and antioxidants.

* * * * *